United States Patent
Hanamoto

(10) Patent No.: US 7,054,508 B2
(45) Date of Patent: May 30, 2006

(54) DATA EDITING APPARATUS AND METHOD

(75) Inventor: Takashi Hanamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 550 days.

(21) Appl. No.: 09/916,265

(22) Filed: Jul. 30, 2001

(65) Prior Publication Data

US 2002/0019833 A1 Feb. 14, 2002

(30) Foreign Application Priority Data

Aug. 3, 2000 (JP) ............................. 2000-236137
Nov. 2, 2000 (JP) ............................. 2000-336610

(51) Int. Cl.
*G06K 9/60* (2006.01)

(52) U.S. Cl. ................................................ 382/305

(58) Field of Classification Search ................ 382/309, 382/305; 345/619, 625, 626, 627, 628, 629, 345/634, 635, 638; 707/104.1
See application file for complete search history.

(56) References Cited

U.S. PATENT DOCUMENTS

| | | | | |
|---|---|---|---|---|
| 6,389,181 B1* | 5/2002 | Shaffer et al. | ............... | 382/305 |
| 6,396,963 B1* | 5/2002 | Shaffer et al. | ............... | 382/305 |
| 6,504,571 B1* | 1/2003 | Narayanaswami et al. | ....... | 348/231.99 |
| 6,690,843 B1* | 2/2004 | Squilla et al. | ............... | 382/306 |
| 2002/0040375 A1* | 4/2002 | Simon et al. | ................ | 707/517 |
| 2002/0075330 A1* | 6/2002 | Rosenzweig et al. | ....... | 345/854 |
| 2002/0093678 A1* | 7/2002 | Skidgel et al. | ............. | 358/1.15 |
| 2002/0122067 A1* | 9/2002 | Geigel et al. | ............... | 345/788 |
| 2002/0154147 A1* | 10/2002 | Battles | ........................ | 345/660 |
| 2004/0078293 A1* | 4/2004 | Iverson et al. | ................ | 705/27 |

FOREIGN PATENT DOCUMENTS

JP 11-234560 8/1999

OTHER PUBLICATIONS

Webster's Ninth New Collegiate Dictionary, Merriam-Webster, Inc., 1991, p. 1188.*

* cited by examiner

*Primary Examiner*—Samir Ahmed
*Assistant Examiner*—Brian Le
(74) *Attorney, Agent, or Firm*—Fitzpatrick, Cella, Harper & Scinto

(57) ABSTRACT

An apparatus which automatically generates a digital album by using binary data with meta data. One of previously-provided scenarios and an image data group to be used in an album are selected. Next, keywords described in the meta data of the image data group are compared with keywords of respective templates linked to the selected scenario, and based on the result of comparison, the image data are assigned to the templates. Then, the assigned image data are inserted into image data frames in the templates, thereby a digital album is generated. The album is saved as a SVG file or JPEG image file.

54 Claims, 26 Drawing Sheets

FIG. 3A

CONTENTS OF META DATA ADDED TO IMAGE DATA 1

```
301 — <?xml version = "1.0" encoding = "Shift_JIS" ?>
302 — <PHOTO>
303 —   <ITEM ATTR = "Photographer" > Takashi Hanamoto </ITEM>
304 —   <ITEM ATTR = "Date" > 2000-5-5 </ITEM>
305 —   <ITEM ATTR = "Location" > Kamakura Dai-Ichi Junior High School </ITEM>
306 —   <ITEM ATTR = "Event" > sports</ITEM>
307 —   <ITEM ATTR = "Event" > opening ceremony </ITEM>
308 —   <ITEM ATTR = "Event" > 50th anniversary meeting </ITEM>
        </PHOTO>
```

FIG. 3B

CONTENTS OF META DATA ADDED TO IMAGE DATA 2

```
<?xml version = "1.0" encoding = "Shift_JIS" ?>
<PHOTO>
  <ITEM ATTR = "Photographer" > Takashi Hanamoto </ITEM>
  <ITEM ATTR = "Date" > 2000-5-5 </ITEM>
  <ITEM ATTR = "Location" > Kamakura Dai-Ichi Junior High School </ITEM>
  <ITEM ATTR = "Event" > sports </ITEM>
  <ITEM ATTR = "Event" > opening address </ITEM>
  <ITEM ATTR = "Event" > last meeting before rebuilding </ITEM>
</PHOTO>
```

- 301: `<?xml version = "1.0" encoding = "Shift_JIS" ?>`
- 302: `<PHOTO>`
- 303: `<ITEM ATTR = "Photographer" > Takashi Hanamoto </ITEM>`
- 304: `<ITEM ATTR = "Date" > 2000-5-5 </ITEM>`
- 305: `<ITEM ATTR = "Location" > Kamakura Dai-Ichi Junior High School </ITEM>`
- 306: `<ITEM ATTR = "Event" > sports </ITEM>`
- 309: `<ITEM ATTR = "Event" > opening address </ITEM>`
- 310: `<ITEM ATTR = "Event" > last meeting before rebuilding </ITEM>`

FIG. 3C

CONTENTS OF META DATA ADDED TO IMAGE DATA 3

```
<?xml version = "1.0" encoding = "Shift_JIS" ?>
<PHOTO>
<ITEM ATTR = "Photographer" > Takashi Hanamoto </ITEM>
<ITEM ATTR = "Date" > 2000-5-5 </ITEM>
<ITEM ATTR = "Location" > Kamakura Dai-Ichi Junior High School </ITEM>
<ITEM ATTR = "Event" > sports </ITEM>
<ITEM ATTR = "Event" > relay race </ITEM>
<ITEM ATTR = "Event" >win by 3rd grade 2nd class after defeat seems certain </ITEM>
</PHOTO>
```

301 — `<?xml version = "1.0" encoding = "Shift_JIS" ?>`
302 — `<PHOTO>`
303 — `<ITEM ATTR = "Photographer" > Takashi Hanamoto </ITEM>`
304 — `<ITEM ATTR = "Date" > 2000-5-5 </ITEM>`
305 — `<ITEM ATTR = "Location" > Kamakura Dai-Ichi Junior High School </ITEM>`
306 — `<ITEM ATTR = "Event" > sports </ITEM>`
311 — `<ITEM ATTR = "Event" > relay race </ITEM>`
312 — `<ITEM ATTR = "Event" >win by 3rd grade 2nd class after defeat seems certain </ITEM>`

FIG. 3D

CONTENTS OF META DATA ADDED TO IMAGE DATA 4

```
<?xml version = "1.0" encoding = "Shift_JIS" ?>
<PHOTO>
    <ITEM ATTR = "Photographer" > Takashi Hanamoto </ITEM>
    <ITEM ATTR = "Date" > 2000-5-5 </ITEM>
    <ITEM ATTR = "Location" > Kamakura Dai-Ichi Junior High School </ITEM>
    <ITEM ATTR = "Event" > sports </ITEM>
    <ITEM ATTR = "Event" > leaving </ITEM>
</PHOTO>
```

CONTENTS OF META DATA ADDED TO IMAGE DATA 5

```
<?xml version = "1.0" encoding = "Shift_JIS" ?>
<PHOTO>
    <ITEM ATTR = "Photographer" > Takashi Hanamoto </ITEM>
    <ITEM ATTR = "Date" > 2000-5-5 </ITEM>
    <ITEM ATTR = "Location" > Kamakura Dai-Ichi Junior High School </ITEM>
314 —— <ITEM ATTR = "Event" > opening</ITEM>
315 —— <ITEM ATTR = "Event" > bread eating race </ITEM>
</PHOTO>
```

FIG. 4A

SCENARIO OF DIGITAL ALBUM

| SCENARIO | CONTENT |
|---|---|
| 1 | SPORTS |
| 2 | WEDDING CEREMONY |
| 3 | FAMILY TRIP |
| 4 | GOLF COMPETITION |
| ⋮ | ⋮ |

FIG. 4B

```
<?xml version = "1.0" encoding = "Shift_JIS" ?>
<ALBUM SCENARIO = sports>
   <TEMPLATE NUMBER = "1" > opening ceremony.svg </TEMPLATE>
   <TEMPLATE NUMBER = "2" > bread eating race.svg </TEMPLATE>
   <TEMPLATE NUMBER = "3" > other activities.svg </TEMPLATE>
   <TEMPLATE NUMBER = "4" > closing ceremony.svg </TEMPLATE>
</ALBUM>
```

EXAMPLE OF TEMPLATE OF SPORTS(OPENING CEREMONY)

EXAMPLE OF TEMPLATE OF SPORTS(BREAD EATING RACE)

EXAMPLE OF TEMPLATE OF SPORTS(OTHER ACTIVITIES...)

EXAMPLE OF TEMPLATE OF SPORTS(CLOSING CEREMONY)

FIG. 6

ALBUM STRUCTURE OF SPORTS

| CONTENT OF EVENT | OPENING CEREMONY | BREAD EATING RACE | OTHER ACTIVITIES | CLOSING CEREMONY | |
|---|---|---|---|---|---|
| TEMPLATE NUMBER | TEMPLATE 201 | TEMPLATE 202 | TEMPLATE 203 | TEMPLATE 204 | KEYWORD PRIORITY |
| META DATA KEYWORD | OPENING CEREMONY | BREAD EATING RACE | RELAY RACE | CLOSING CEREMONY | FIRST |
| | OPENING | BREAD | CHEERING | END | SECOND |
| | OPENING ADDRESS | JUMP | LUNCH | LEAVING | THIRD |
| | LEAVING | ......... | POLL TILTING | ......... | FOURTH |
| | ......... | | ......... | | FIFTH |
| | | | | | SIXTH |
| | | | | | ......... |

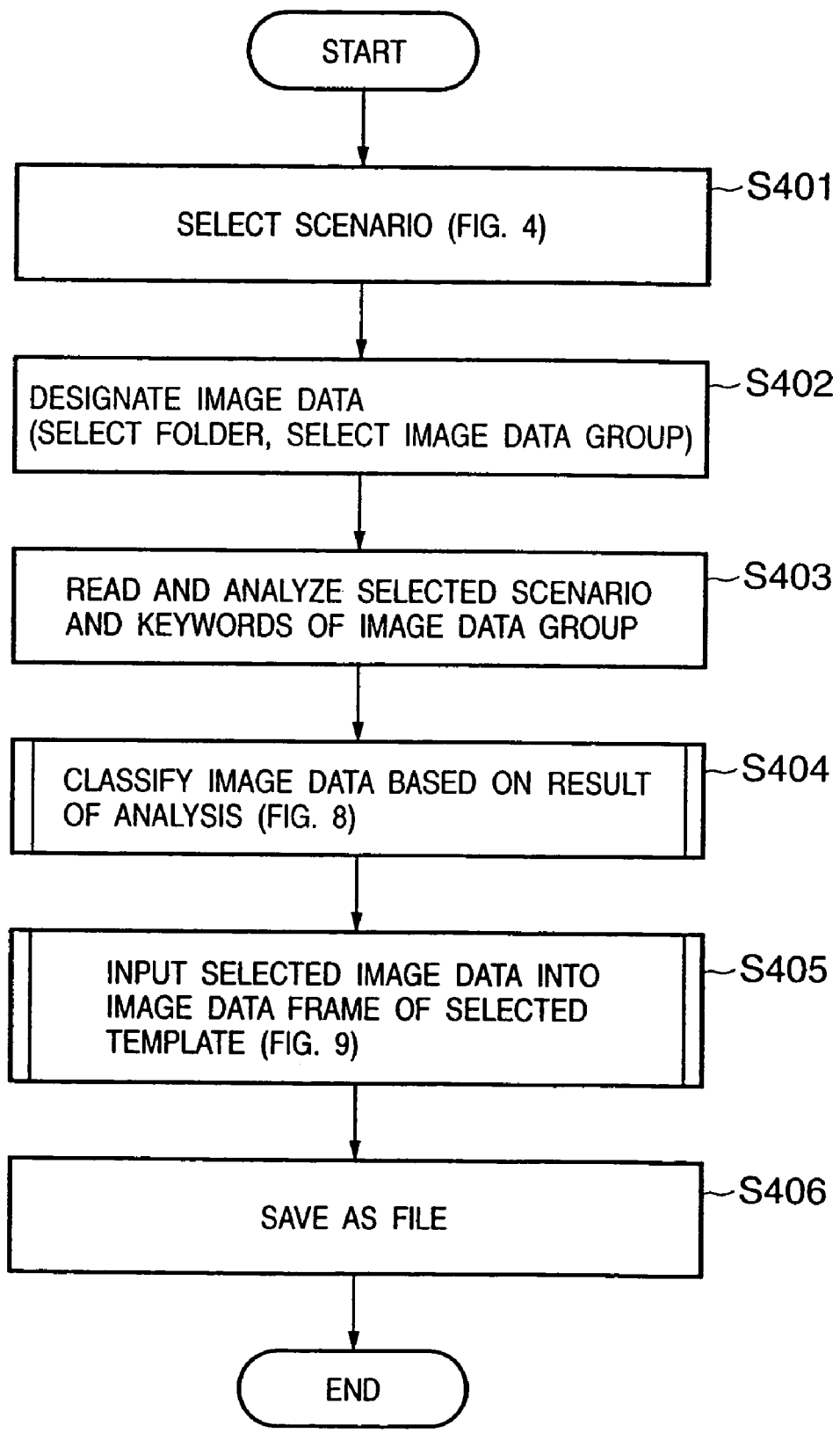

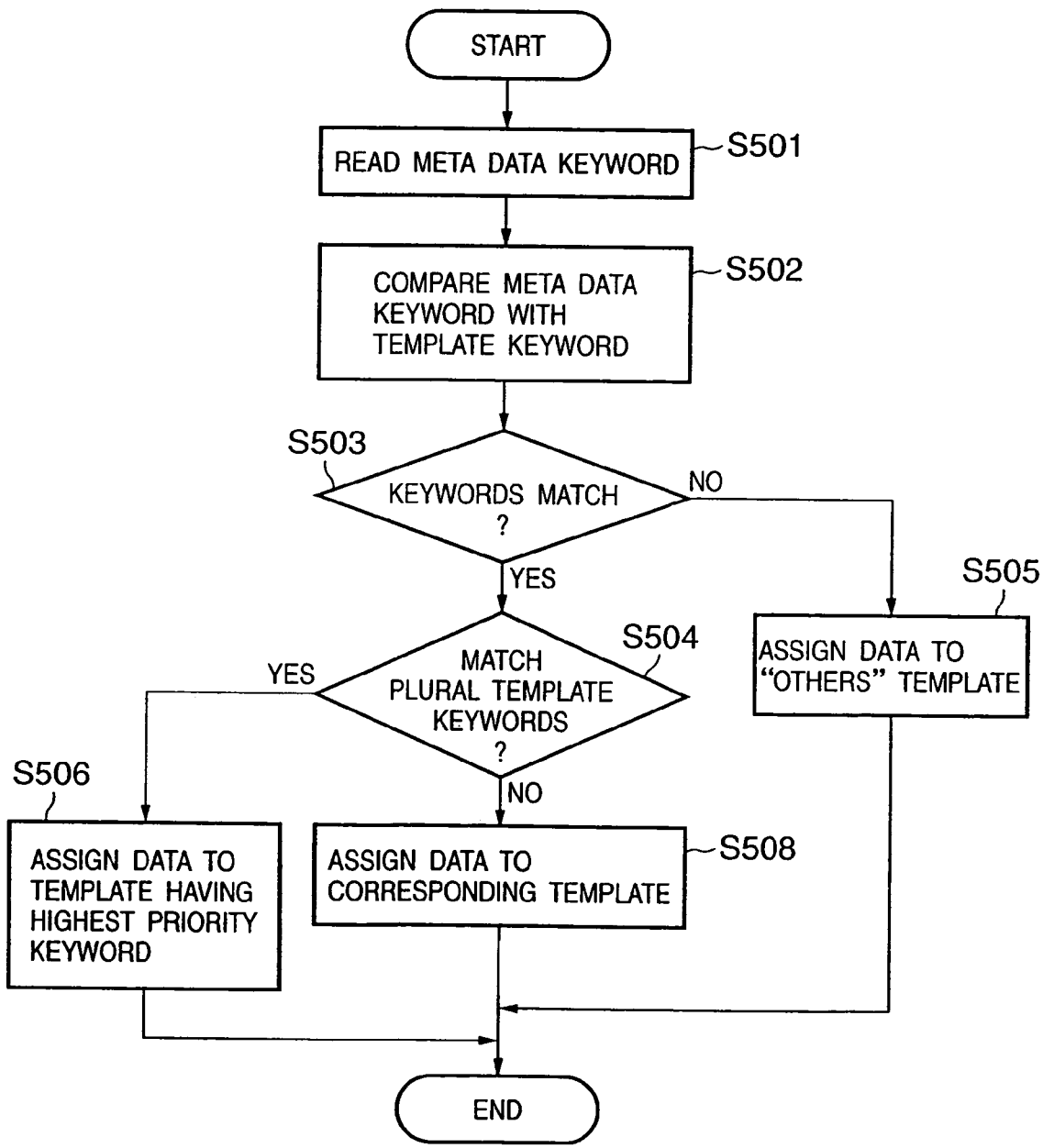

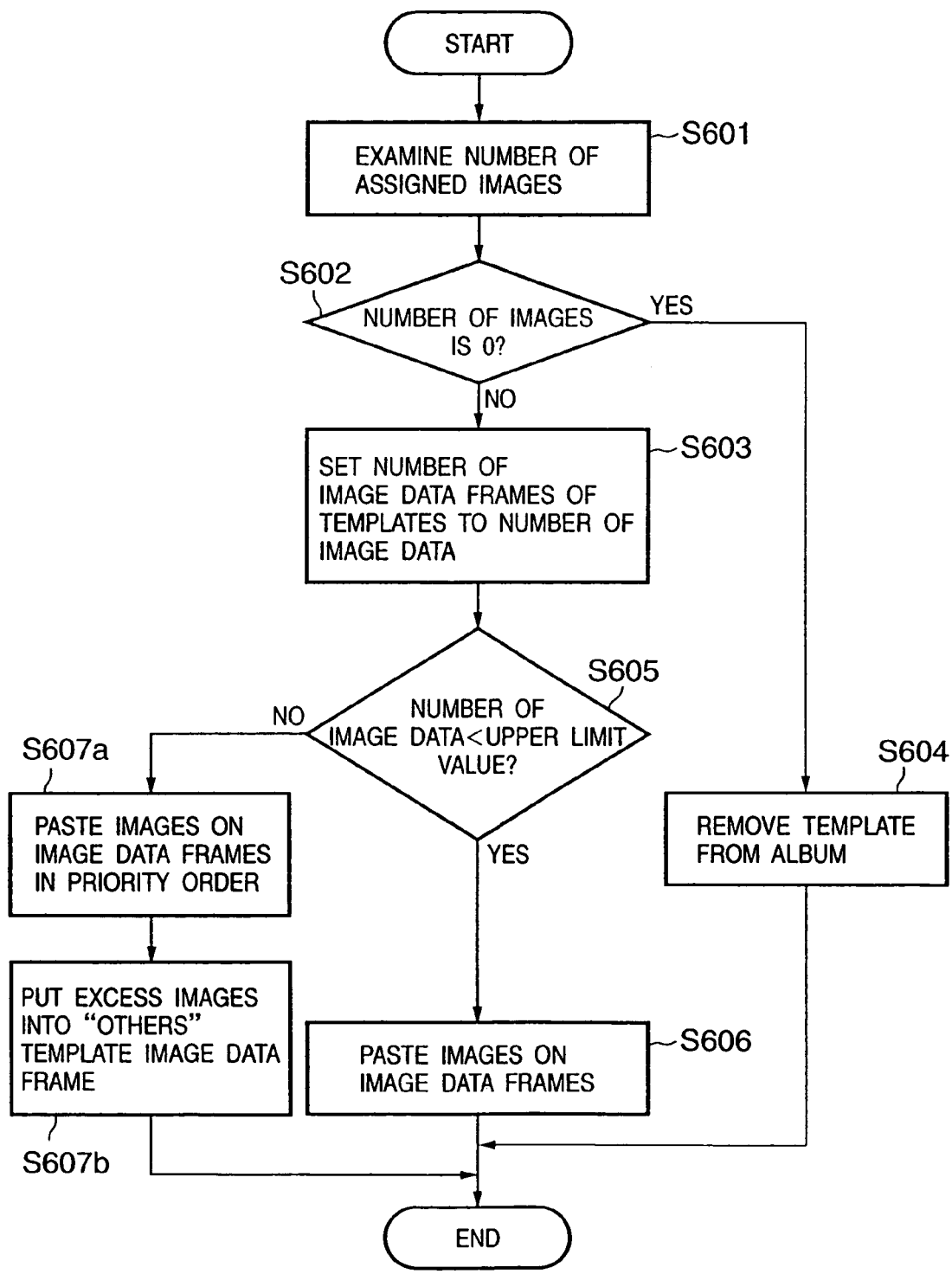

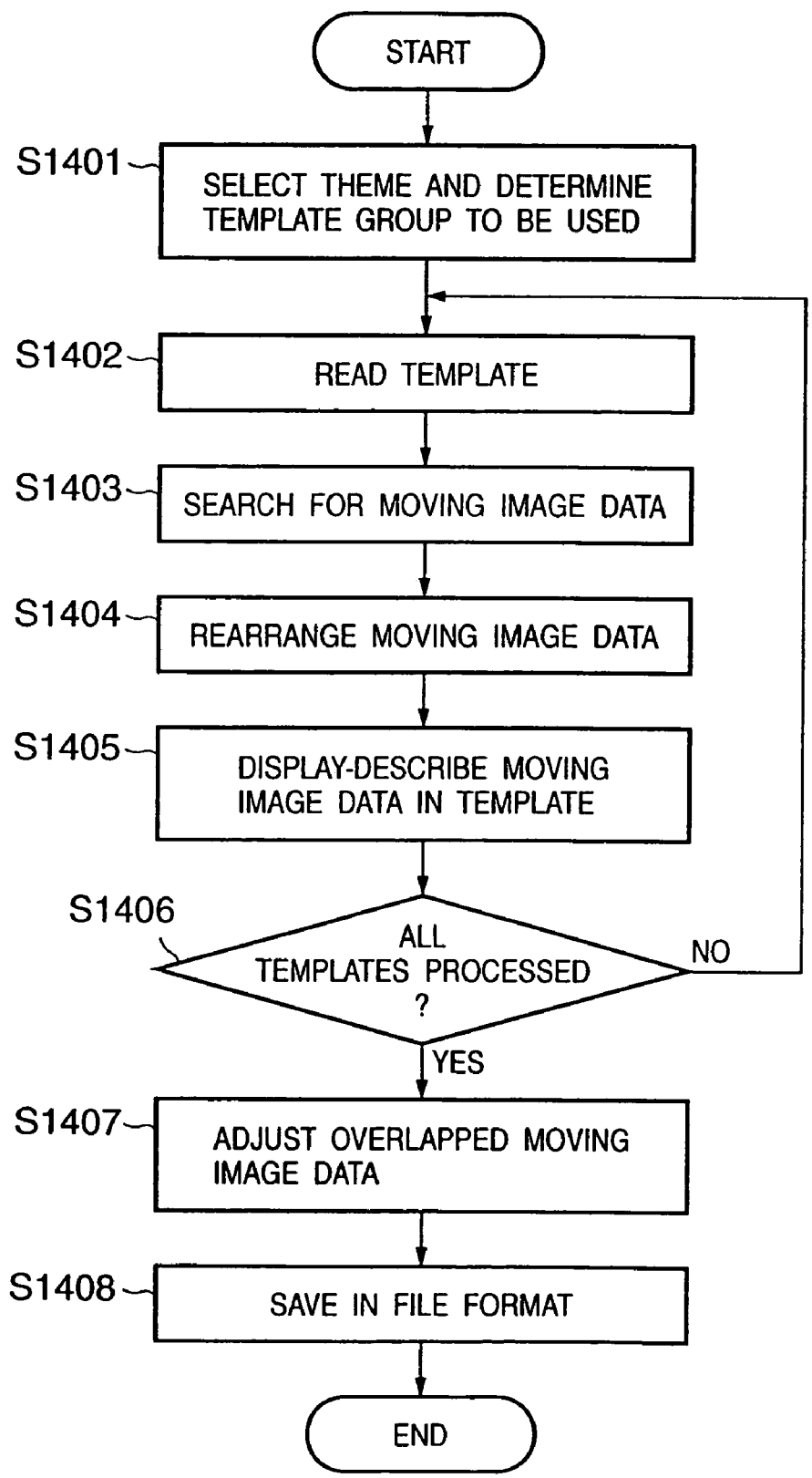

DATA EDITING APPARATUS AND METHOD

FIELD OF THE INVENTION

The present invention relates to data editing apparatus and method, and more particularly, to data editing apparatus and method preferably used for generating a digital album utilizing binary data such as still image data, audio data and moving image data.

BACKGROUND OF THE INVENTION

As digital still cameras and digital video cameras are widely used, the amount of so-called binary data such as still image data, moving image data and audio data, handled for domestic use is dramatically increasing. To effectively utilize these binary data, some search and management methods are required.

For example, one method is using a digital album to arrange digital image data and browse the data. A digital album is an image display which looks like a silver-chloride photo album, having a digital image pasted on a background image called a template.

In use of digital album, image data can be simply arranged, and storage and browsing can be made without consideration of storage space of image data, and further, appearance of browsed images are improved. However, actually, digital albums are not positively utilized for storage and management of digital image data. To generate a digital album, as it is necessary to design the album by e.g. selecting backgrounds of respective digital image data, the works to generate a digital album are complicated and troublesome. As the number of digital images increases, the load of the works increases.

For example, moving image data obtained by image sensing using a digital video camera or the like can be inputted into a personal computer or specialized device and subjected to various processings and editing. Various processings and editing include addition of title, joining moving image data and the like. The moving image data are arranged by the editing, and appearance of moving image data upon browsing is improved.

However, actually, people are not willing to improve an opportunity to edit moving image data since processing/editing of moving image data requires complicated works by using specialized software, and such work becomes heavy load on users. For example, it is troublesome to find necessary moving image data and it requires a skilled technique to rearrange data and process a joint between images.

On the other hand, Japanese Published Examined Patent Application No. Hei 11-234560 proposes a technique of adding meta data to still image data and audio data and utilizing the data for generation of moving image data. However, there is no technique of adding meta data to moving image data itself and utilizing the data for editing the moving image data.

SUMMARY OF THE INVENTION

The present invention has been made in consideration of the above situation, and has its object to appropriately assign binary data to previously-provided templates. This facilitates e.g. generation of digital album.

Further, another object of the present invention is to automate moving image editing thereby facilitate editing of moving image data.

According to the present invention, the foregoing object is attained by providing a data editing method for performing editing on binary data by using plural templates having keywords, comprising: an assignment step of assigning each of plural binary data to one of the plural templates based on the keywords; and a construction step of, upon reproduction of the plural binary data by using the plural templates, constructing reproduction data so as to reproduce the plural binary data in accordance with the result of assignment at the assignment step.

According to another aspect of the present invention, the foregoing object is attained by providing a data editing apparatus for performing editing on binary data, comprising: storage means for storing plural templates having keywords; assignment means for assigning each of plural binary data to one of the plural templates based on the keywords; and construction means for, upon reproduction of the plural binary data by using the plural templates, constructing reproduction data so as to reproduce the plural binary data in accordance with the result of assignment by the assignment means.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A to 3E are examples of meta data showing contents of image data 1 to 5;

FIG. 4A is a table showing a digital album scenario;

FIG. 4B is an example of the digital album scenario;

FIG. 6 is a table showing keywords linked to the respective templates;

FIG. 7 is a flowchart showing a digital album generation procedure;

FIG. 8 is a flowchart showing selection of template matching each image data;

FIG. 9 is a flowchart showing a procedure of inserting selected image data into a corresponding template;

FIG. 13 is a flowchart showing processing upon moving image editing;

DETAILED DESCRIPTION OF THE PREFERRED EMBODIMENTS

Preferred embodiments of the present invention will now be described in detail in accordance with the accompanying drawings.

In the following embodiments, generation of digital album by using a recording apparatus will be described, however, the scope of the present invention is not limited to the embodiments.

To perform image data search and management, it is efficient to handle image data including so-called meta data, i.e., additional information explaining the image data such as name of person, title of event, date and keyword. Meta data means "data on data" used as additional data explaining the contents of binary data such as image data and audio data. If the meta data is added to each binary data, image data, audio data and the like can be found by a keyword search. Further, as more meta data are added to the respective binary data, searches can be performed on the respective binary data with more keywords. In the following embodiments, meta data as described above is utilized.

<First Embodiment>

[System Configuration of Recording Apparatus]

Figure 1:
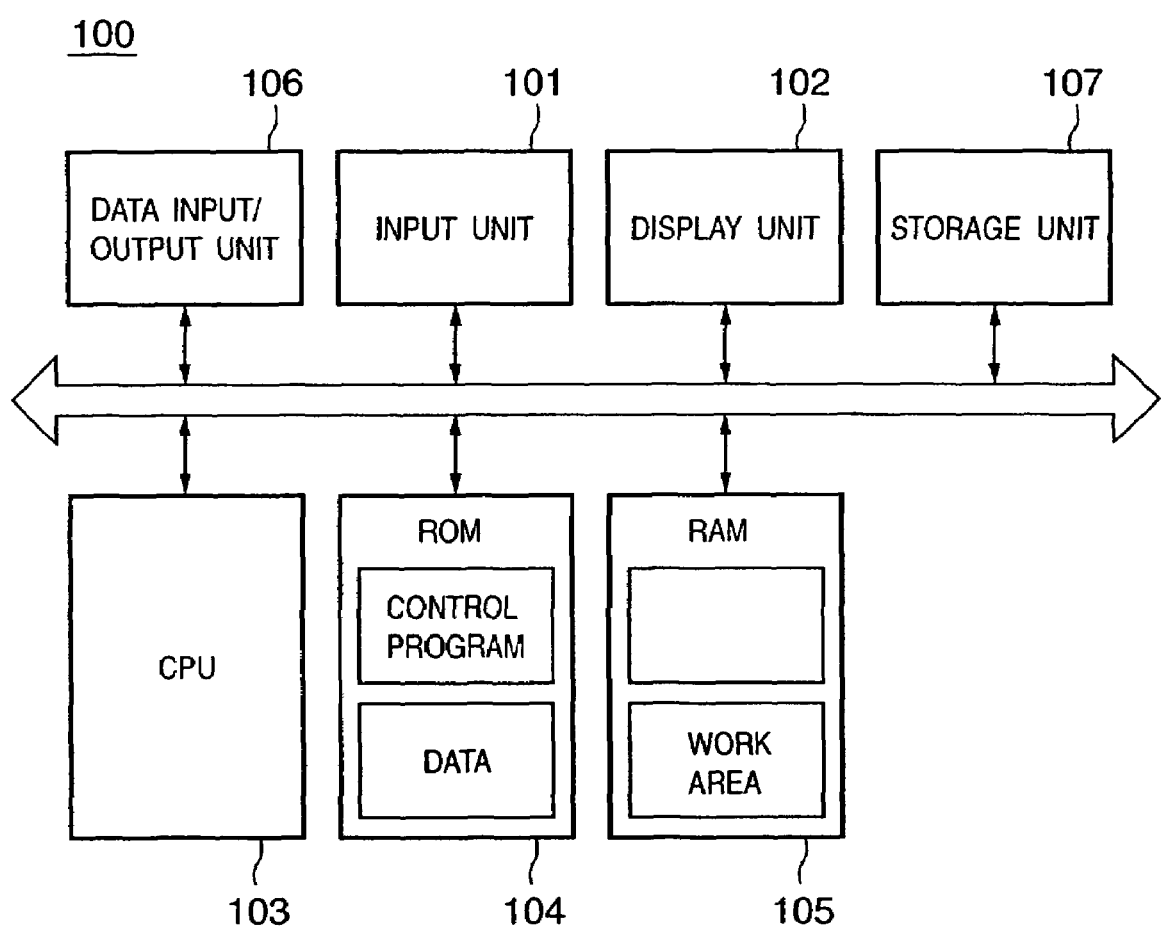
FIG. 1 is a block diagram showing the system configuration of a recording apparatus used for generation of digital album according to a first embodiment of the present invention.

FIG. 1 is a block diagram showing the system configuration of a recording apparatus 100 according to a first embodiment of the present invention.

In FIG. 1, a data input/output unit 106 inputs/outputs various data including binary data such as image data with meta data, and meta data. An input unit 101 inputs instructions and data from a user by using various input devices such as a keyboard and a mouse.

A display unit 102 which is a CRT, a liquid crystal display or the like, displays image data or displays a GUI screen image where picture, icons and the like are displayed. A storage unit 107 which is a hard disk is used for storing various data such as binary data and meta data.

Numeral 103 denotes a CPU which relates to all the processings of the above-described elements. A ROM 104 and a RAM 105 provide programs, data, work area and the like necessary for the processings to the CPU 103. Further, control programs necessary for the respective processings as shown in the flowcharts of FIGS. 7 to 9 are stored in the storage unit 107 or the ROM 104. If the control programs are stored in the storage unit 107, the programs are temporarily read into the RAM 105 then executed.

Note that in the system configuration, various constituent elements other than the above-described elements exist, however, as the explanation of those elements is not a principle object of the present invention, the explanation will be omitted.

[Image Data to which Meta Data is Linked]

Figure 2A:
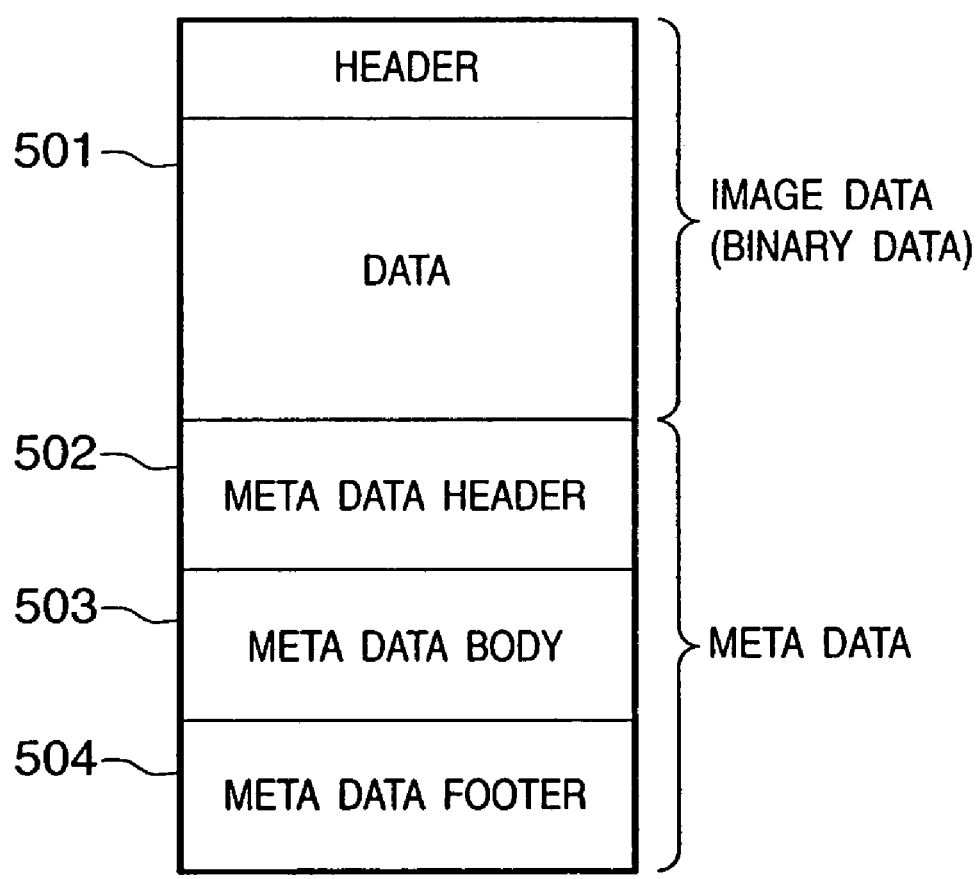
FIG. 2A is an example of data structure where meta data indicating the contents of image data is added to the image data.
Figure 2B:
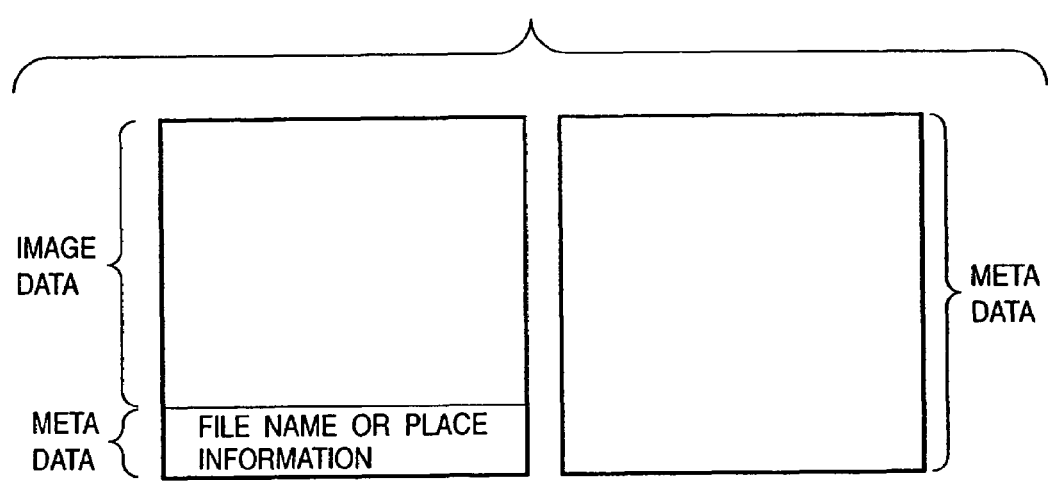
FIG. 2B is a schematic diagram showing image data and meta data indicating the contents of the image data linked to the image data.

FIGS. 2A and 2B show examples of image data to which meta data is linked, used in the present embodiment.

FIG. 2A shows an example where all the meta data as additional information of respective image data are added to the end of the respective image data. FIG. 2B shows an example where two types of meta data exist. One meta data is added to the end of image data, and the other meta data is independent of the image file. The independent meta data has description of additional information of the image. On the other hand, the meta data added to the image data has descriptions of file name of the independent meta data, a file path, and a pointer indicating the location of the meta data, and the like.

In the case of FIG. 2B, the additional information of each image data is found by a search using a meta data file name or a pointer indicating the location of meta data. It may be arranged such that if image data is selected, meta data as additional information is automatically selected and a keyword described in the meta data is displayed on the display unit 102.

FIGS. 3A to 3E are examples of meta data added to image data 1 to 5 showing only the meta data from FIG. 2A or 2B.

Note that in the above examples, the meta data are described in XML, however, the meta data may be described in other data description languages than XML such as SGML and HTML.

Further, the image data 1 to 5 show examples of image data obtained in sports. The meta data explaining the contents of the respective image data include, as common keywords, e.g., 303 (Photographer: Takashi Hanamoto), 304 (Date: May 5, 2000), 305 (Location: Kamakura Dai-Ichi Junior High School), and 306 (Event: sports) in FIG. 3A.

Further, as the other keywords, the meta data explaining the contents of the respective image data include, e.g., 307 (Event: opening ceremony (FIG. 3A)), 309 (Event: opening address (FIG. 3B)), 311 (Event: relay race (FIG. 3C)), 313 (Event: leaving (FIG. 3D)), 314 (Event: opening (FIG. 3E)), and 315 (Event: bread eating race (FIG. 3E)).

Note that the above keywords are shown as examples, and more information may be provided.

[Digital Album]

A digital album is used for arrangement and browsing of digital images as described above. An image where a digital image is pasted on a background image called a template is displayed on a display screen as if it is a silver-chloride photo album.

The recording apparatus 100 of the present embodiment has previously-provided various scenarios (or themes), "sports", "wedding ceremony", "family trip", "golf competition" and the like, necessary upon generation of digital album as shown in FIG. 4A. Each scenario has plural templates. For example, the scenario "sports" has templates as shown in FIGS. 5A to 5D. The scenario is stored as a template group having plural templates or a template file in the storage unit 107.

As shown in FIG. 4B, a scenario is constructed with an XML file and text files, and has descriptions of file names of respective templates constructing the scenario, and locations of the files. That is, when the system reads an XML file describing a scenario, the system can automatically read a template group constructing the scenario.

Figure 5A:
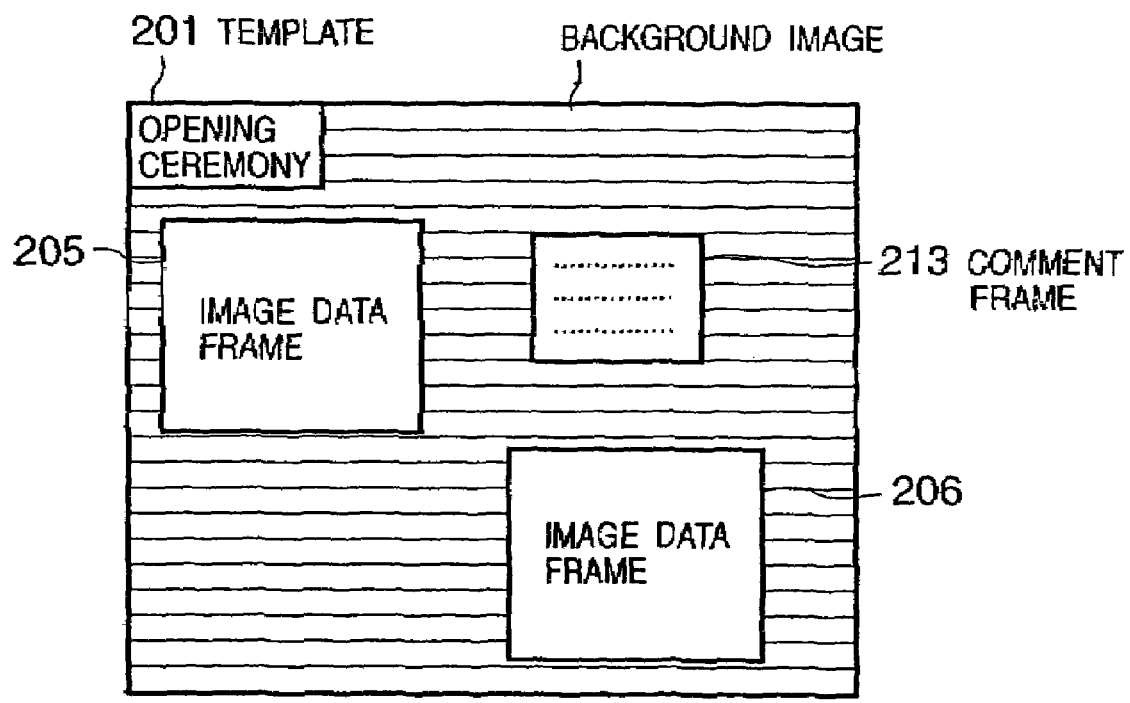
FIGS. 5A to 5D are examples of templates for generation of digital album.
Figure 5B:
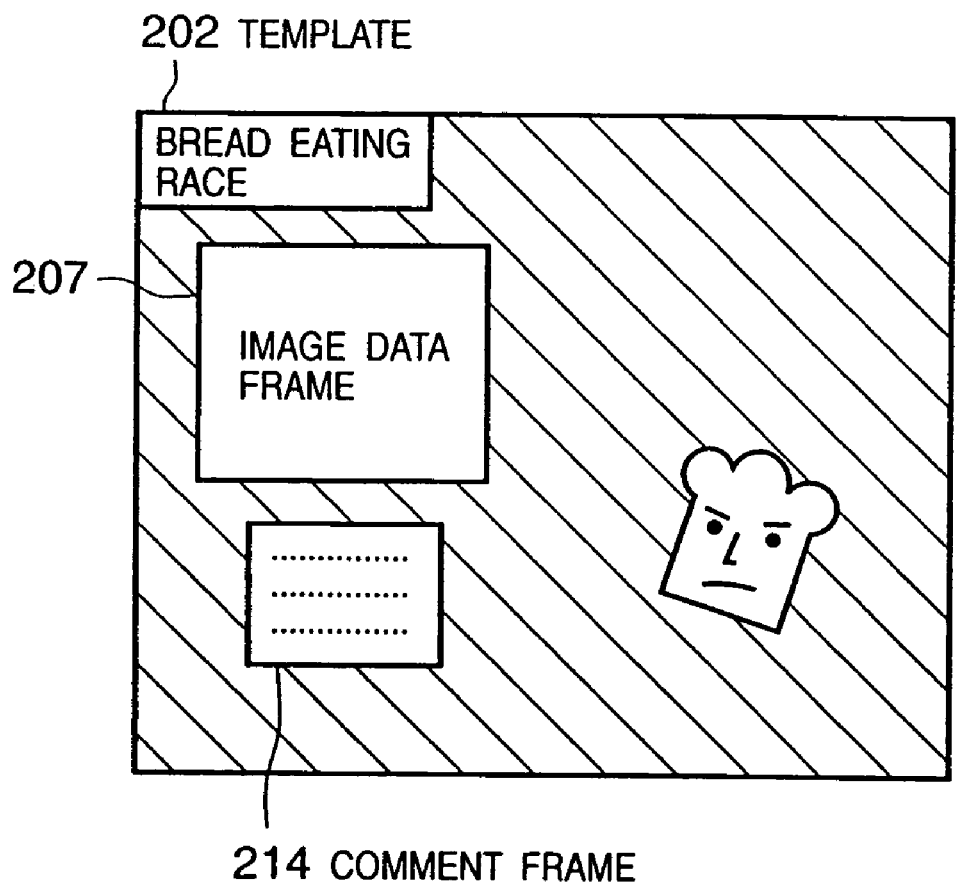
Figure 5C:
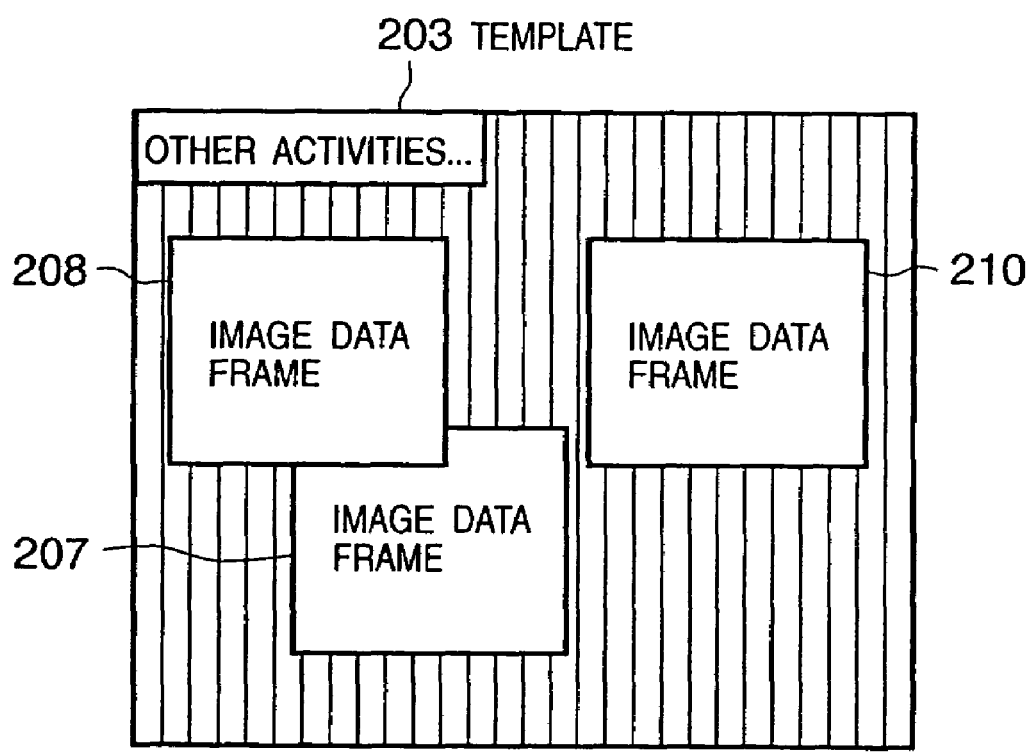
Figure 5D:
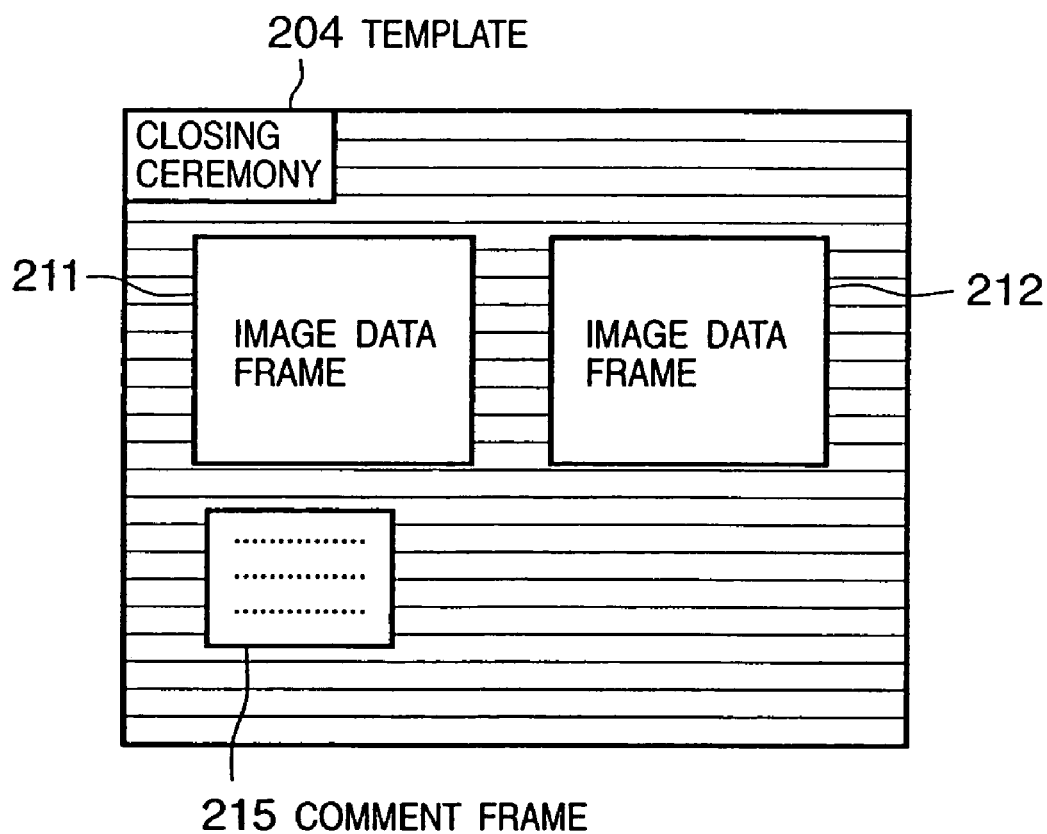

In FIG. 5A, a template 201 is an example of "opening ceremony"; in FIG. 5B, a template 202, an example of "bread eating race"; in FIG. 5C, a template 203, an example of "other activities"; and in FIG. 5D, a template 204, an example of "closing ceremony". As shown in the figures, the templates respectively have different backgrounds and different layouts, with frames where selected images are pasted or necessary comments are inputted. Further, the templates are described in SVG (Scalable Vector Graphics) file format as a two-dimensional graphics description language. Note that the templates may be image files such as JPEG image files.

In the recording apparatus 100, a digital album is generated by selecting a scenario appropriate to input image data from the previously-provided scenarios, next, selecting necessary templates in accordance with the selected scenarios, and pasting the image data on the selected templates.

Note that the templates as shown in FIGS. 5A to 5D include audio data, and sound reproduction can be performed upon album browsing. Further, as shown in FIG. 6, template keywords are provided for the respective templates, and the keywords are utilized upon comparison with meta data keywords of meta data as additional information of image data, for selection of optimum template. This operation will be described in detail in the flowchart of FIGS. 7 to 9.

Note that the template 203 "other activities" in FIG. 5C is a template provided for storing image data which does not match any of the keywords "opening ceremony", "bread eating race" and "closing ceremony" ("others" template).

Further, as shown in FIG. 6, the template keywords have priorities. For example, the "opening ceremony" template 201 previously has template keywords "opening ceremony", "opening", "opening address" and "leaving".

Among these keywords, the keyword "opening ceremony" has the first priority, and the keyword "opening" has the second priority. In this manner, the templates respectively have a predetermined priority.

Further, as shown in FIGS. 5A to 5D, the templates have image data frames 205 to 212 where image data are to be pasted. Further, the size and number of image data frames can be increased/decreased in correspondence with image data to be pasted.

Further, comment frames 213 to 215 are areas where comments on pasted image data are displayed.

[Digital Album Generation Procedure]

FIG. 7 is a flowchart showing a digital album generation procedure by using the recording apparatus 100.

First, at step S401, a scenario of digital album to be generated is selected from the scenarios as shown in FIG. 4A. In the present embodiment, a list of the scenarios in FIG. 4A is displayed on the display unit 102, and a desired scenario is selected by using a pointing device of the input unit 101. When a scenario has been selected, plural templates linked to the selected scenario are selected. Otherwise, a template file linked to the selected scenario is selected.

Next, the process proceeds to step S402, at which a folder holding image data to be used in the album is selected or image data group to be used in the album is selected. Further, it may be arranged such that an image data group to be used in the album is previously designated, and when a scenario is selected, the image data group is automatically selected.

Next, at step S403, image data are read one by one from the image data group in the selected folder or selected image data group, and the contents of meta data as additional information of the image data are read into the RAM 105. Then, a keyword matching analysis is performed by comparing a keyword of the read meta data with the respective template keywords. This processing is performed on all the image data in the selected folder or selected image data group.

Next, at step S404, based on the result of matching analysis at step S403, the image data are classified by template. The details of the processing at steps S403 and S404 will be described in detail with reference to the flowchart of FIG. 8.

Next, at step S405, the image data classified by template by the processing at step S404 are inserted into the respective image data frames. The details of the processing will be described in detail with reference to the flowchart of FIG. 9.

Next, at step S406, the generated digital album is saved in SVG (Scalable Vector Graphic) file format as a two-dimensional graphics language or an image file format such as JPEG, and the series of digital album generation operation is completed. In this manner, a digital album can be generated by a simple operation by, e.g., automatically pasting image data on the templates in FIGS. 5A to 5D. Further, comments can be freely written in the comment frames 213 to 215 after the generation of digital album.

[Image Data Assignment]

FIG. 8 is a flowchart showing the image data classification operation at steps S403 and S404 in FIG. 7. Note that as the processing shown in FIG. 8 is performed on meta data of one image data, the processing in FIG. 8 is repeated by the number of image data to be processed.

First, at step S501, a keyword is read from the meta data of processed image data (e.g., any one of the keywords in FIGS. 3A to 3E).

Next, at step S502, a matching analysis is performed between the read meta data keyword and keywords described in the respective templates (FIG. 6).

Next, at step S503, if it is determined as a result of matching analysis that the meta data keyword matches some of the template keywords, the process proceeds to step S504, while if the meta data keyword does not match any template keyword, the process proceeds to step S505.

At step S504, the number of template keywords matching the meta data keyword is examined. If the meta data keyword matches plural template keywords, the process proceeds to step S506, while if the meta data keyword matches one template keywords, the process proceeds to step S508.

Next, at step S506, a highest priority keyword is searched from the obtained plural keywords, then the image data is assigned to the template of the highest priority keyword, and the series of operations is completed.

Next, the case where the meta data explaining the contents of the image data 5 has two keywords "opening" and "bread eating race" will be described with reference to the example of FIG. 3E.

In this case, as the keywords match the template 201 with the second priority ("opening") and the template 202 with the first priority ("bread eating race"), the templates 201 and 202 can be used.

However, as the priority order of "bread eating race" is first in the template 202 and that of "opening" is the second in the template 201, the highest priority keyword "bread eating race" is taken, and the keyword is assigned to the template 202. That is, the image data 5 is assigned to the template 202.

Note that if the image data frame 207 of the template 202 is already filled with a predetermined number of image data, the image data 5 is assigned to the template 202 with the next priority order keyword "opening".

The "assignment to the next highest priority template" is repeated until a template having an available image data frame is found. If none of the templates has an available image data frame, the image data is assigned to the "others"

template. Further, if plural highest-priority keywords exist, the image data is assigned at random.

Another example will be described with reference to FIG. 3D where the meta data explaining the contents of the image data 4 has a keyword "leaving". In this case, as the keyword matches the 4th priority keyword of the template 201 ("leaving") and the 3rd priority keyword of the template 204 ("leaving"), the both templates 201 and 204 can be used.

However, as the priority order of the keyword "leaving" is the 3rd in the template 204 and the 4th in the template 201, the template 204 is used prior to the template 201. As a result, the keyword is assigned to the template 204. That is, the image data 4 is assigned to the template 204.

The "assignment to the next highest priority template" is repeated until a template having an available image data frame is found. If none of the templates has an available image data frame, the image data is assigned to the "others" template. Further, if plural keywords have the same priority order, the image data is assigned at random.

On the other hand, if the number of templates is one, the process proceeds from step S506 to S508, at which the image data is assigned to the selected template, and the series of operations is terminated.

For example, the keywords "opening ceremony" and "opening address" of the image data 1 (FIG. 3A) and the image data 2 (FIG. 3B) both match keywords of the template 201. Further, the template 201 has two image data frames. Accordingly, the image data 1 and the image data 2 are both assigned to the template 201.

Next, at step S505, image data assignment is performed in the case where the keyword of the meta data does not match any of the keywords of the templates 201, 202 and 204 in FIG. 6, as in the case of FIG. 3C. The image data is assigned to "other activities" of the template 203 in FIG. 6 as the "others" template, and the series of operations is terminated.

[Image Data Pasting]

FIG. 9 is a flowchart showing a procedure of inserting image data, assigned to a corresponding template, into image data frames. The following processing is performed on all the templates included in the scenario.

First, at step S601, the number of image data assigned to a template is examined.

Next, at step S602, it is determined whether or not the number of assigned image data is 0. If the number of image data is not 0, the process proceeds to step S603, while if the number of image data is 0, the process proceeds to step S604.

Next, at step S604, the template having no image data is removed from the album, and the series of operations is terminated.

On the other hand, at step S603, the number of image data frames of the template is increased/decreased to be equal to the number of the assigned image data. Note that a predetermined upper limit is set on the number of image data frames so as to avoid concentration of image data into one template.

Next, the process proceeds to step S605, at which it is determined whether or not the number of image data is greater than the predetermined upper limit value of the image data frames. If the number of image data is not greater than the predetermined upper limit value of the image data frames, the process proceeds to step S606, at which the assigned image data are pasted on the image data frames of the respective templates as shown in FIGS. 5A to 5D. Then the series of operations is terminated.

On the other hand, at step S605, if the number of image data to be pasted is greater than the upper limit value of the number of the image data frames, the process proceeds to step S607*a*, at which the image data are pasted, sequentially from image data having the highest priority keyword, on the image data frames. At step S607*b*, the remaining image data, which have not been pasted at step S607*a*, are pasted on the image data frame of the "other activities" template 203. Then the series of operations is terminated.

Further, if plural image data have the same priority, image data are selected at random from those image data and pasted on the image data frames, and the remaining image data which have not been pasted are pasted on the image data frame of the "other activities" template 203. Further, if many image data are pasted on the "other activities" template 203 and the number of image data is greater than the upper limit number of the image data frames, the "other activities" template 203 is duplicated and the remaining image data are pasted on the newly-duplicated "other activities" template 203.

In this manner, the user obtains digital album automatically-generated only by performing a simple operation, i.e., designation of desired image data group and desired template. Further, it may be arranged such that the keyword at the end of the meta data, e.g., the keyword "50th anniversary meeting" (308) in FIG. 3A or the keyword "last meeting before rebuilding" in FIG. 3B is automatically inserted in the comment frame 213. The recognition of comment is made by, e.g., in meta data having keywords each belonging to any of the templates, detecting a keyword which does not belong to any of the templates. Further, comments may be manually put in the respective comment frames 213 (FIG. 5A) with a keyboard etc.

Further, in the above embodiment, still image data with meta data is handled, however, audio data with meta data or moving image data with meta data may be incorporated into a template described in SMIL (Synchronized Multimedia Integration Language) as a multimedia description language and used for generation of digital album.

Note that SMIL is a multimedia language used in RealPlayer or the like for describing a method of reproduction of moving image data, audio data and still image data. As the method of digital album generation is the same as described above using still image data, i.e., selecting a scenario, searching meta data for necessary moving image data and/or audio data and inserting the data into templates, the explanation of the method will be omitted here.

As described above, according to the present embodiment, a digital album can be automatically generated only by designating a scenario and an image data group using still image data with meta data. Thus, the recording apparatus and method of the present embodiment omit many troublesome works in generation of digital album.

Further, it is preferable that a desired album can be easily generated only by selecting a template file constructed with plural templates. Further, in the case where an upper limit is set on binary data arrangeable in template, if the binary data are rearranged when the number of binary data is greater than the upper limit, the same template is newly generated. Accordingly, even if many meta data have a particular content and they cannot be arranged in one template, remaining data can be arranged in the newly-generated same template.

As described above, the present invention provides apparatus and method for easily generating a digital album by utilizing binary data to which meta data is previously added.

Further, the invention provides apparatus and method for automatically generating a digital album by utilizing meta data added to binary data.

<Second Embodiment>

Figure 10:
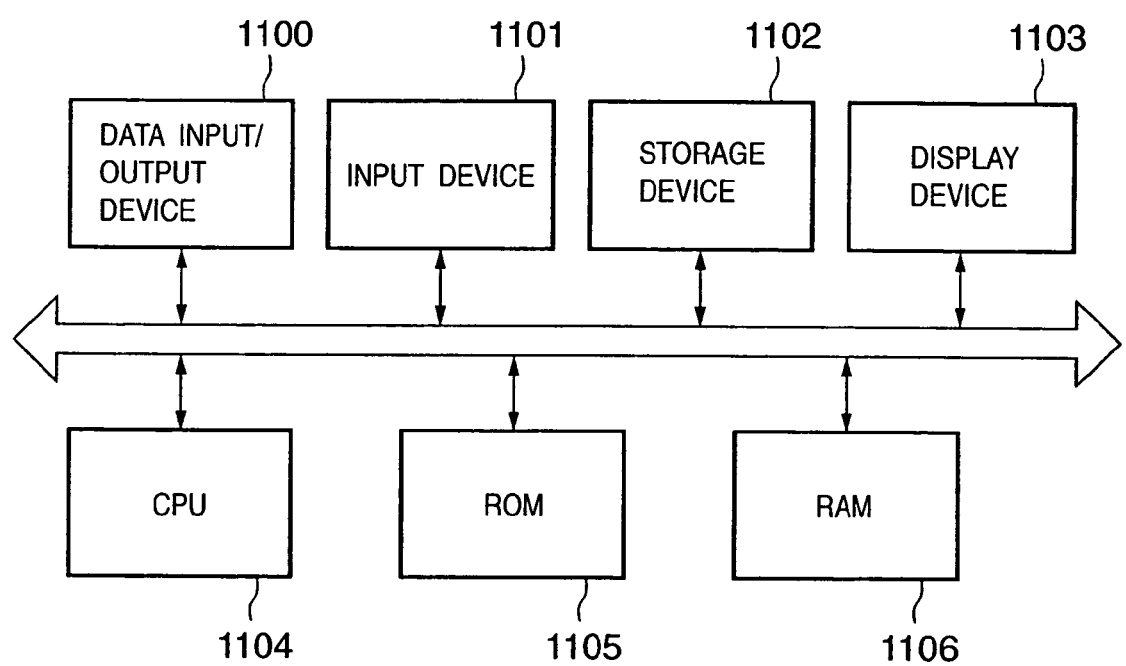
FIG. 10 is a block diagram showing the system configuration of moving image data editing apparatus according to a second embodiment of the present invention.

In the present embodiment, editing of moving image data is performed by using a personal computer, a specialized device or the like as a moving image data editing apparatus. FIG. 10 is a block diagram showing the system configuration of the moving image editing apparatus according to the second embodiment.

In FIG. 10, numeral 1100 denotes a data input/output device which performs data input/output; 1101, an input device including a keyboard and a pointing device such as a mouse, which inputs instructions and data from the user; and 1102, a storage device such as a hard disk in which binary data as moving image data to be edited and meta data linked to the binary data are stored.

Numeral 1103 denotes a display device which displays a GUI and images under the control of CPU 1104. As the display device 1103, a CRT, a liquid crystal display or the like is used. The CPU 104 relates to all the processings at the above-described elements. Numerals 1105 and 1106 denote a ROM and a RAM which provide programs, data, work area and the like necessary for various processings to the CPU 1104. Note that control programs necessary for the respective processings as shown in the flowcharts of FIG. 13 and the subsequent figures are stored in the storage device 1102 or the ROM 1105. If the control programs are stored in the storage device 1102, the programs are temporarily read into the RAM 1106 then executed by the CPU 1104.

Note that in the system configuration, various constituent elements other than the above-described elements exist, however, as the explanation of those elements is not a principle object of the present invention, the explanation will be omitted.

Moving image editing is reading moving image data obtained by a digital video camera or the like into a personal computer or the like, then adding a title, rearranging image data, and/or processing a joint between images. In the moving image editing method according to the present embodiment, themes such as "sports" and "wedding ceremony" are prepared, then a search is made for image data corresponding to one of the themes, and the obtained moving image data are automatically display-described in pre-determined templates.

Figure 11:
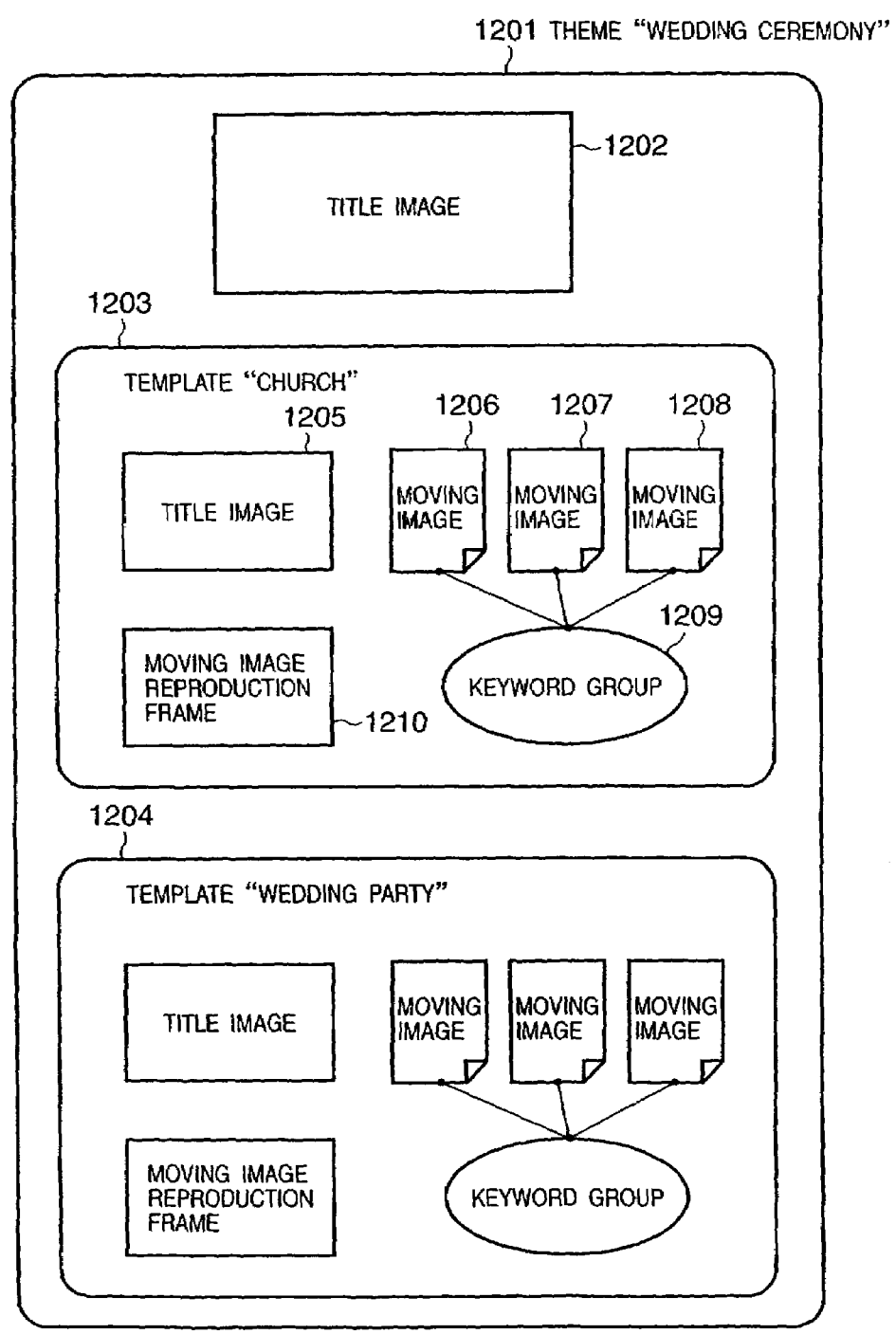
FIG. 11 is an explanatory view of moving image editing processing according to the second embodiment.

FIG. 11 is an explanatory view schematically showing moving image editing processing according to the present embodiment. Upon editing, first, a large frame such as a theme 1201 is set. In this embodiment, as an example of theme, "wedding" is used. The theme 1201 includes a theme title image 1202 and one or more templates 1203 and 1204. The title image 1202 displays a title corresponding to the theme 1201. The title image is a content displayed, e.g., in the first place, upon moving image reproduction.

A template produces one partitioned scene in a theme. For example, in the theme "wedding", "church" of the template 1203 and "wedding party" of the template 1204 correspond to such scenes. The template includes a template title image 1205, a template keyword 1209 prepared in the template, a moving reproduction frame 1210 and the like. The title image 1205 first displays a template title upon moving image reproduction within the template.

The keyword 1209 is used for searching for moving image data put in the template 1204. A moving image search is made based on whether or not the keyword 1209 matches the content of meta data registered in moving image data.

Otherwise, a moving image search is made based on whether or not a feature amount linked to the keyword matches that of image. The moving image found by the search is inserted in the template. For example, assuming that a keyword "chaplain" exists in the template 1203, and meta data "chaplain" is registered in the moving image data 1206, as the template keyword matches the meta data registered in the moving image data, the moving image data 1206 is inserted into the template 1203.

The moving image reproduction frame 1210 is used as a frame for moving image reproduction or a background. Various patterns and characters are prepared for improvement in appearance upon moving image reproduction. Further, the templates include special effects applied to a joint of moving image data and the like. Further, the templates are arranged in reproduction order. For example, in FIG. 11, the title image 1202, then the template 1203, and the template 1204, are sequentially reproduced.

Note that the reproduction order is described in the theme 1202. That is, in the theme 1201, descriptions of the title image, the template 1203 and the template 1204 are made in the reproduction order. Each template has descriptions of title image, moving images obtained by search, data reproduced in a joint between respective moving images (or special effect in the joint) and the like.

Hereinbelow, moving image editing by utilizing a moving image data search using meta data will be described. Meta data means data on data, including a keyword for moving image data in the present embodiment.

Figure 12A:
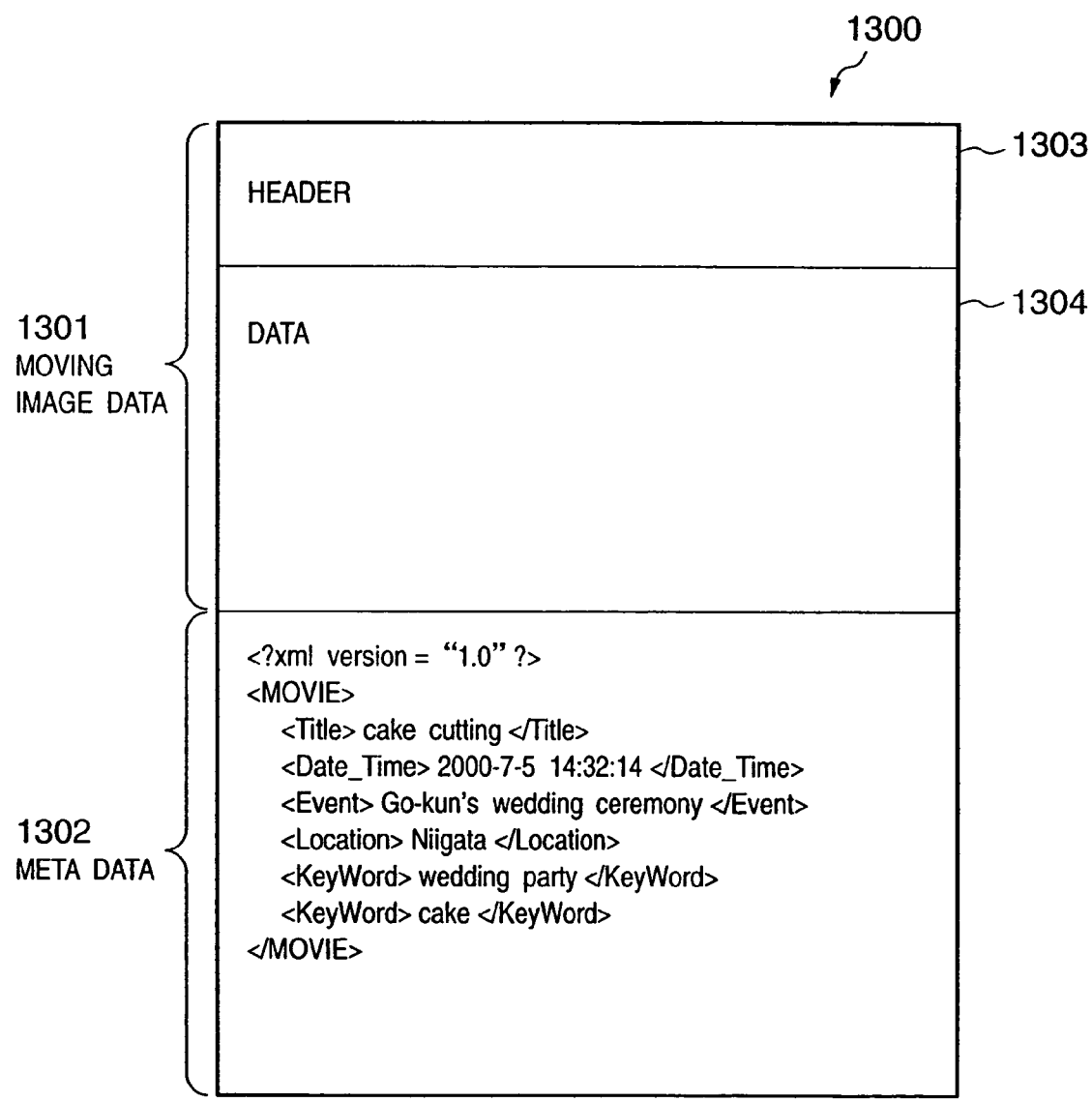
FIGS. 12A and 12B are tables showing data structures where meta data is added to moving image data.

FIG. 12A shows a data structure where meta data is added to moving image data. In FIG. 12A, an image file 1300 has moving image data 1301 and meta data 1302 added to the end of the moving image data 1301. Note that in the present embodiment, moving image data with meta data will be referred to as a moving image file.

The moving image data 1301 has a general data format having a header 1303 and data 1304. In the present embodiment, the meta data 1302 described in XML language includes information "location", "date", "object", "keyword" and the like. The meta data may have more information. Further, as the data description language in the meta data, other data description languages such as HTML and SGML than the XML may be used.

Further, meta data may be added to plural positions in one moving image file. For example, in FIG. 12B, a data portion of one image moving data is divided into three parts in time unit (data 1311, 1313 and 1315), and meta data (1312, 1314 and 1316) are added to the respective partial data. That is, the moving image file 1310 includes a header 1320, the data portion divided into three partial data, and three meta data corresponding to the three partial data. The data division in moving image data is performed in time or frame units.

In addition, it may be arranged such that meta data is described in the header of moving image data, or meta data is held as another file. In the latter case, the meta data includes pointer information to specify image data.

Hereinbelow, processing upon editing using plural moving image files having the above structure will be described.

FIG. 13 is a flowchart showing processing upon moving image editing. First, at step S1401, the theme of moving image to be edited is determined. One of previously-provided themes such as "wedding ceremony" and "sports" is selected. When the theme has been determined, the system automatically selects a template group corresponding to the theme. In the present embodiment, a template group and a description of its reproduction order (hereinbelow referred to as a "theme description") are registered for each theme.

When a theme to be used is determined, a template group to be used and its reproduction order are determined in accordance with the corresponding theme description. For example, in FIG. 11, regarding the theme "wedding ceremony" 1201, a template group having the templates 1203 and 1204 and a theme description indicating that reproduction is made from the template 1203 to the template 1204 are determined. Note that it may be arranged such that editing including deletion/addition of desired template and change of reproduction order can be performed on the theme description.

As described in FIG. 11, each template has descriptions of title image, moving image reproduction frame, keyword group and the like in a multimedia description language such as SMIL. Note that the description may be made in another data description languages such as XML, SVG, XHTML, HTML or SGML.

Next, at step S1402, one of the templates designated by the theme description is read from the storage device 1102 in FIG. 10. Then at step S1403, a search for moving image data is made in accordance with the keyword 1209 described in the template read at step S1402. The details of the search processing will be described later.

At step S1404, the moving image data found by the search at step S1403 are rearranged in time-sequential order by date. Then at step S1405, the moving image data rearranged at step S1404 are described in the templates so as to be displayed in the order. The details of the moving image data display description into the templates will be described later.

At step S1406, it is determined whether or not the moving image data display description has been completed in all the templates in the template group described in the theme description. If a template where the display description has not been completed exists, the process returns to step S1402 to repeat the above-described processing for the remaining templates.

On the other hand, if the moving image data display description has been completed in all the templates, the process proceeds to step S1407, at which overlapped moving image data are adjusted. Overlapped moving image data are moving image data display-described in plural templates. That is, in the processing at step S1407, one moving image data display-described in plural templates is display-described in one more appropriate template.

More specifically, the date of overlapped moving image data is compared with the dates of previous and subsequent moving image data, then the display description of the overlapped moving image data is left only in a template having moving image data with closer date, and the other moving image data are deleted from the other templates. Otherwise, adjustment may be made by matching level between a keyword group included in the meta data and keyword groups described in the templates (the number of keywords matching the meta data).

At step S1408, the plural templates are described as one and outputted as a file. The file has a format as shown in FIG. 2, and outputted in a multimedia description language such as SMIL. Another data description language such as XML, SVG, XHTML, HTML or SGML may be used. Further, the file may be outputted not as a data description language file but as a moving image file in format of MPEG1, MPEG2, MPEG4, AVI, QuickTimeMovie or the like.

Figure 14:
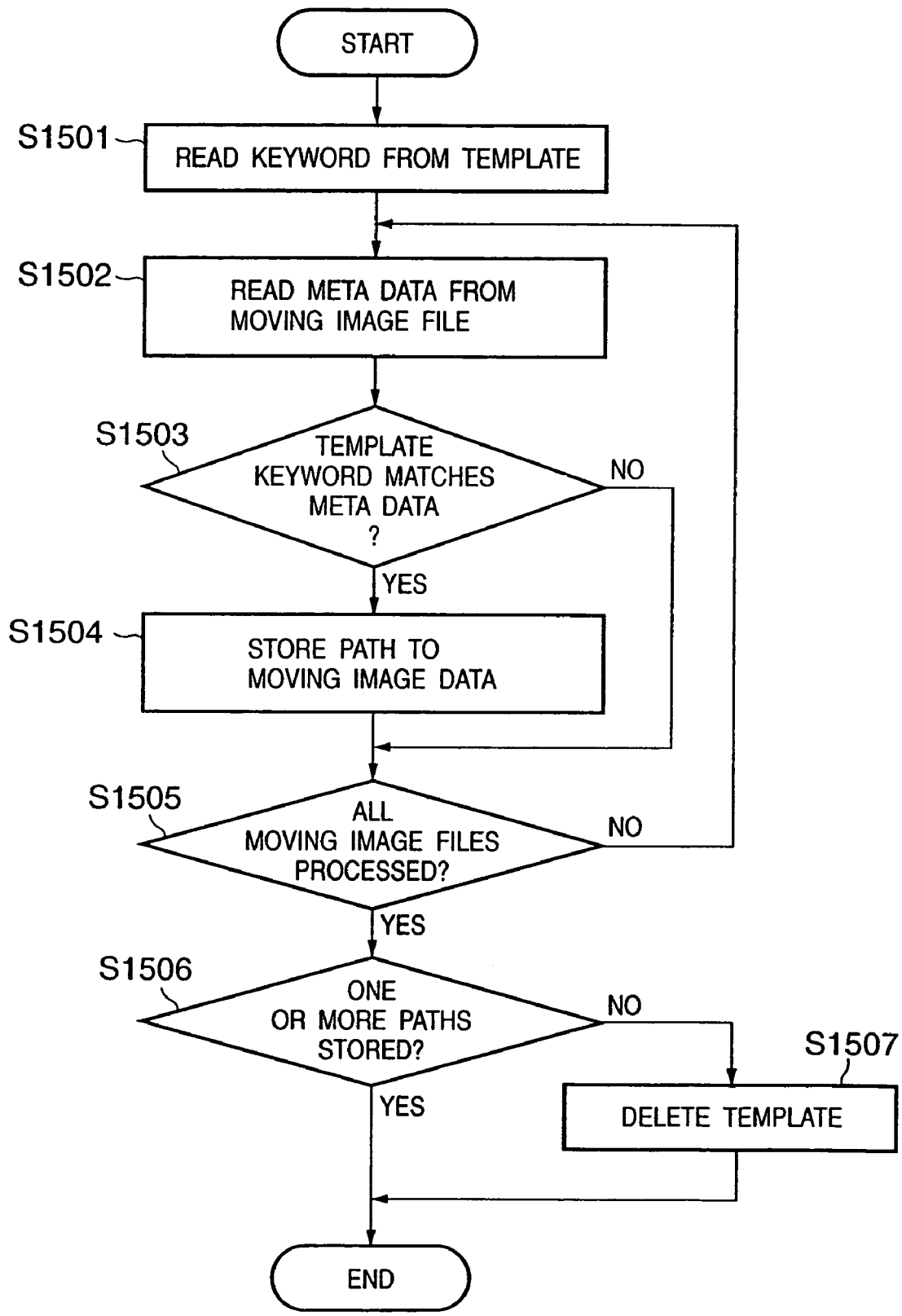
FIG. 14 is a flowchart showing moving image data search processing according to the second embodiment.

Next, the moving image data search processing at step S1403 will be described. FIG. 14 is a flowchart showing the moving image data search processing according to the present embodiment. First, at step S1501, all the keywords described in the template are read and stored into the RAM 1106 in FIG. 10. At step S1502, one of moving image files as a search object is read from the storage device 1102, and meta data is extracted and stored into the RAM 1106 in FIG. 10.

At step S1503, each keyword in the template is compared with the meta data obtained at step S1502 to determine whether or not the keyword matches the meta data. If the keyword matches the meta data, the process proceeds to step S1504, at which a path of the moving image data in the storage device 1102 is stored into the RAM 1106, and the process proceeds to step S1505.

Figure 12B:
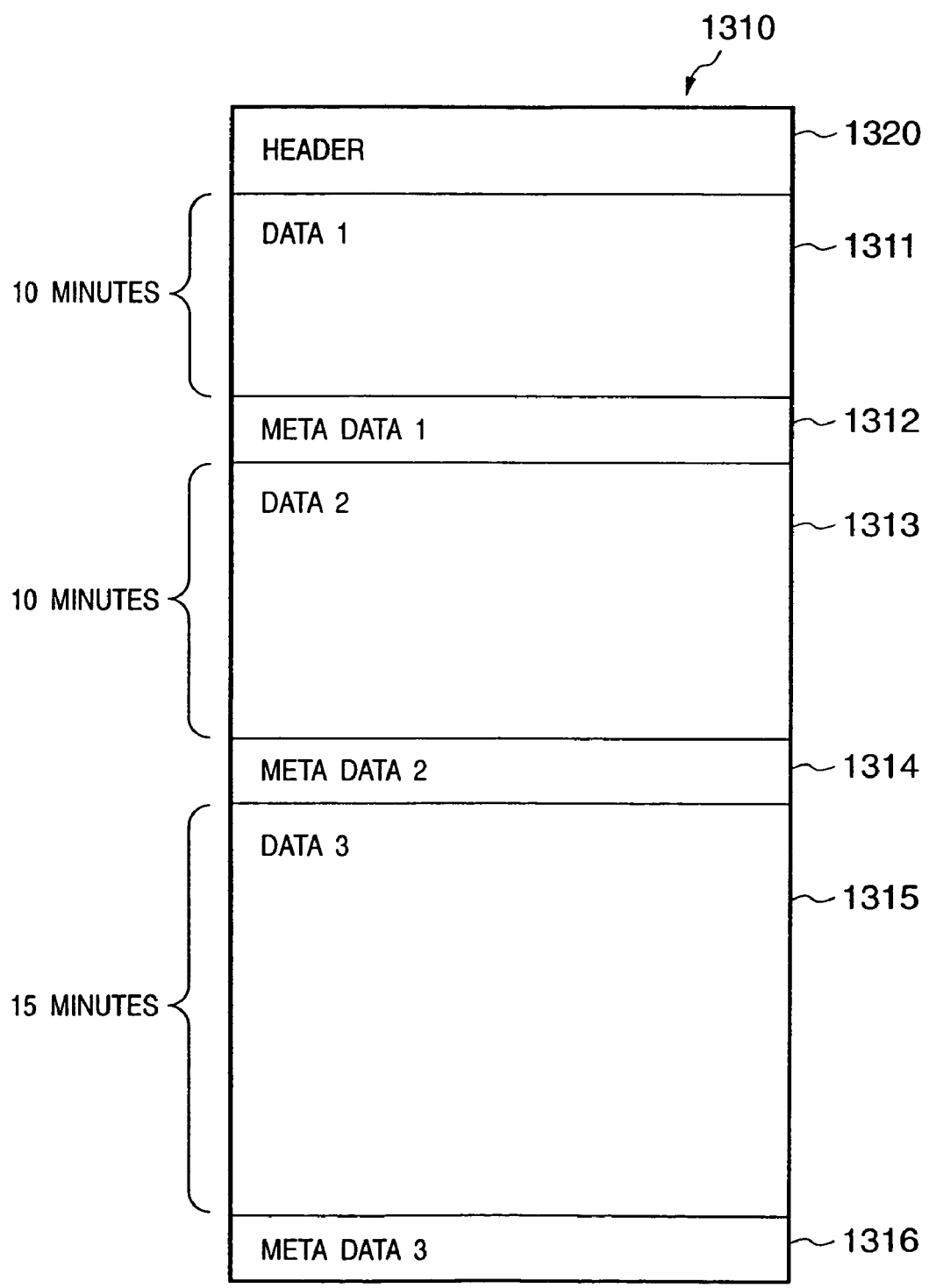

Note that if the moving image file having meta data matching the keyword has a format as shown in FIG. 12A, the path to the moving image file becomes the path to the moving image data. Further, if the moving image file has a structure as shown in FIG. 12B, and the meta data matches the keyword of partial data divided from one moving image data, the position of the partial data in the moving image file is stored into the RAM 1106. The designation of the position of the partial data in the moving image file may be e.g. designation of time (minutes and seconds) from the start position of the moving image data. Otherwise, the number of frames from the start position may be designated. Note that at step S1503, if the keyword does not matches the meta data, the process proceeds to step S1505.

At step S1505, it is determined whether or not the processing at steps S1502 to S1504 has been performed on all the moving image data in the storage device 1102. If there is unprocessed moving image data, the process returns to step S1502, at which the above processing is repeated for the remaining moving image data. On the other hand, if the above processing has been performed on all the moving image data, the process proceeds to step S1506. At step S1506, it is determined whether or not a path to the moving image data exists in the RAM 1106. If no path exists in the RAM, the process proceeds to step S1507, at which the template is deleted from the theme description since the template has no moving image data to be reproduced, and the search operation is terminated. On the other hand, if a path exists, the search operation is terminated after step S1506.

Note that in the above processing, an image file including moving image data and meta data as shown in FIGS. 12A and 12B is handled as a search object, however, if moving image data and meta data are separately held, a search is made for meta data matching the keyword at step S1502, then at step 1504, a path to moving image data registered in the meta data detected by the search is stored into the RAM 1106.

Figure 15:
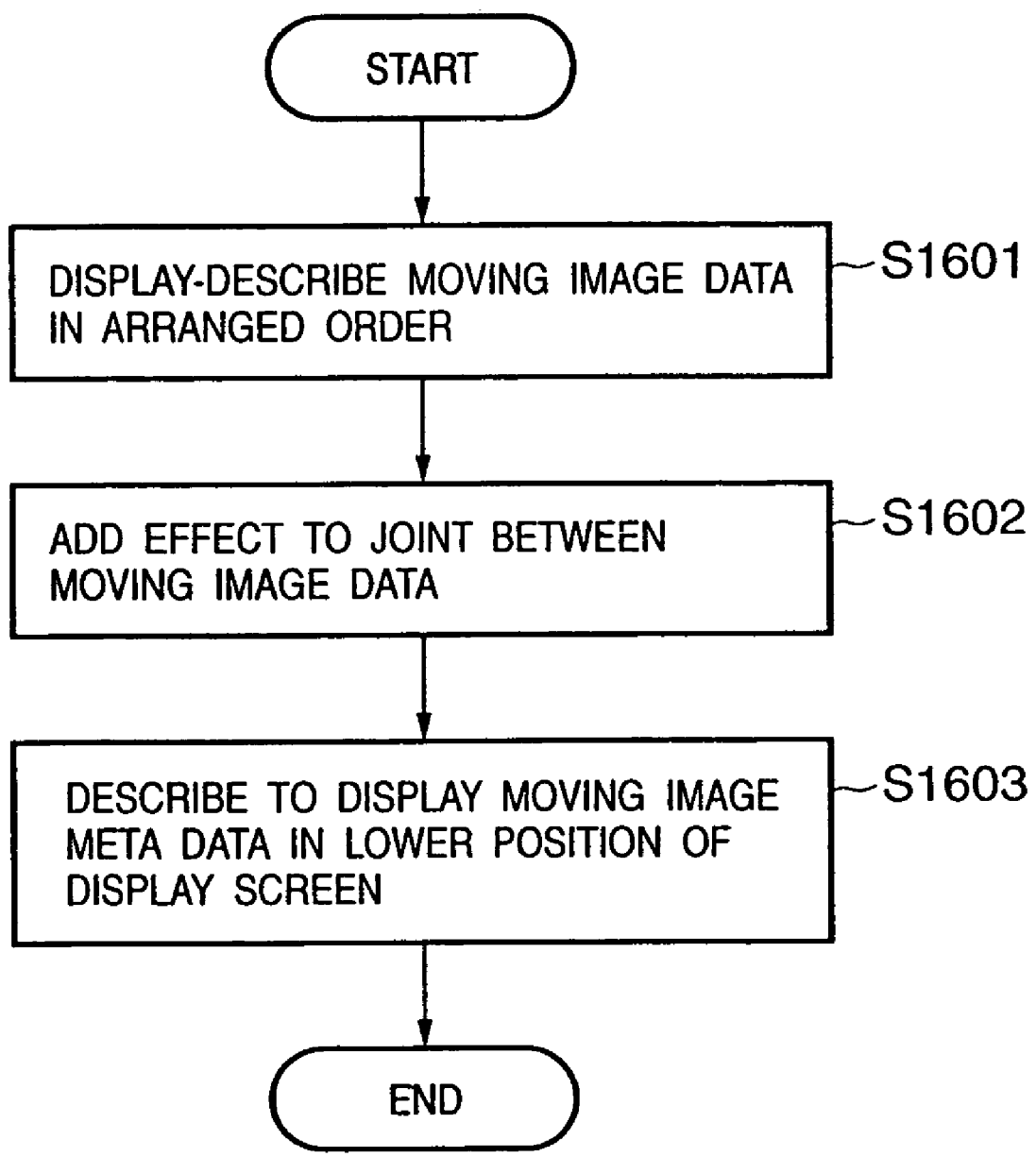
FIG. 15 is a flowchart showing processing of display-describing moving image data in a template.

Next, the processing of display-describing moving image data into the templates at step S1405 in FIG. 13 will be described with reference to the flowchart of FIG. 15.

At step S1601, the moving image data arranged in the time-sequential order by date are display-described in the templates such that the image data are to be reproduced in the order. The dates are obtained from information recorded in the meta data or the headers. At step S1602, in description of plural moving image data, special effect processing is performed on a joint between the moving image data for smooth scene change. The special effect processing is description in accordance with the theme in a description language such as SMIL into the template. For example, if the theme is "wedding ceremony", an animation of crackers of congratulation is prepared as a special effect, and the moving image data changes before or after the special effect. Further, general effects such as dissolve and cross may be used. These special effect processing are previously provided in a description language such as SMIL in the template, and automatically added to the description.

At step S1603, information of time, location and the like are described in the templates so as to be displayed on the display screen. Then the process ends. By this processing, when a predetermined operation (e.g., clicking a predetermined position by a mouse) is performed, meta data on time, location and the like can be displayed on the display screen. It may be arranged such that these data are always displayed.

As described above, according to the present embodiment, moving image data are selected in accordance with a keyword for moving image search described in a template, and display description is made in the template to display the selected moving image data, thereby editing of moving image data is realized. The user merely selects a theme including templates, and the editing operation is extremely easily realized.

Further, if plural moving image data are to be display-described in one template, as predetermined processing is performed on a joint between different moving image data, an editing operation on the joint can be omitted.

Further, if plural moving image data are to be displayed in one template, as the image data are arranged such that reproduction is made in the time-sequential order by date of generation of data, image reproduction can be performed in natural order.

Further, one theme is selected, and plural templates related to the theme are automatically selected. Then editing of moving image data is performed in the respective selected plural templates. Accordingly, the user only selects a theme and the moving image editing is automatically performed, thereby troublesome operations are omitted.

Further, at this time, if image data are display-described in plural templates, only one template in which the moving image data is to be described is automatically selected so as to avoid display description of the moving image data in other templates. Thus overlapped reproduction of image data is prevented, and more appropriate editing is realized.

Further, as shown in FIG. 12B, meta data is added to each partial data divided from moving image data, and image data editing is performed in partial data units. Thus more elaborate image editing is realized.

<Third Embodiment>

In the second embodiment, the moving image data search is performed by using meta data. In the present embodiment, the moving image data search is performed by similar image search and moving image editing is performed.

Similar image search is a technique of dividing an image into arbitrary number of images, extracting feature amount of each image (color and its location) and performing an image search. Note that as the present embodiment has the same construction and processing procedures as those in the second embodiment except the moving image data search, the explanations of the construction and procedures will be omitted.

Figure 16:
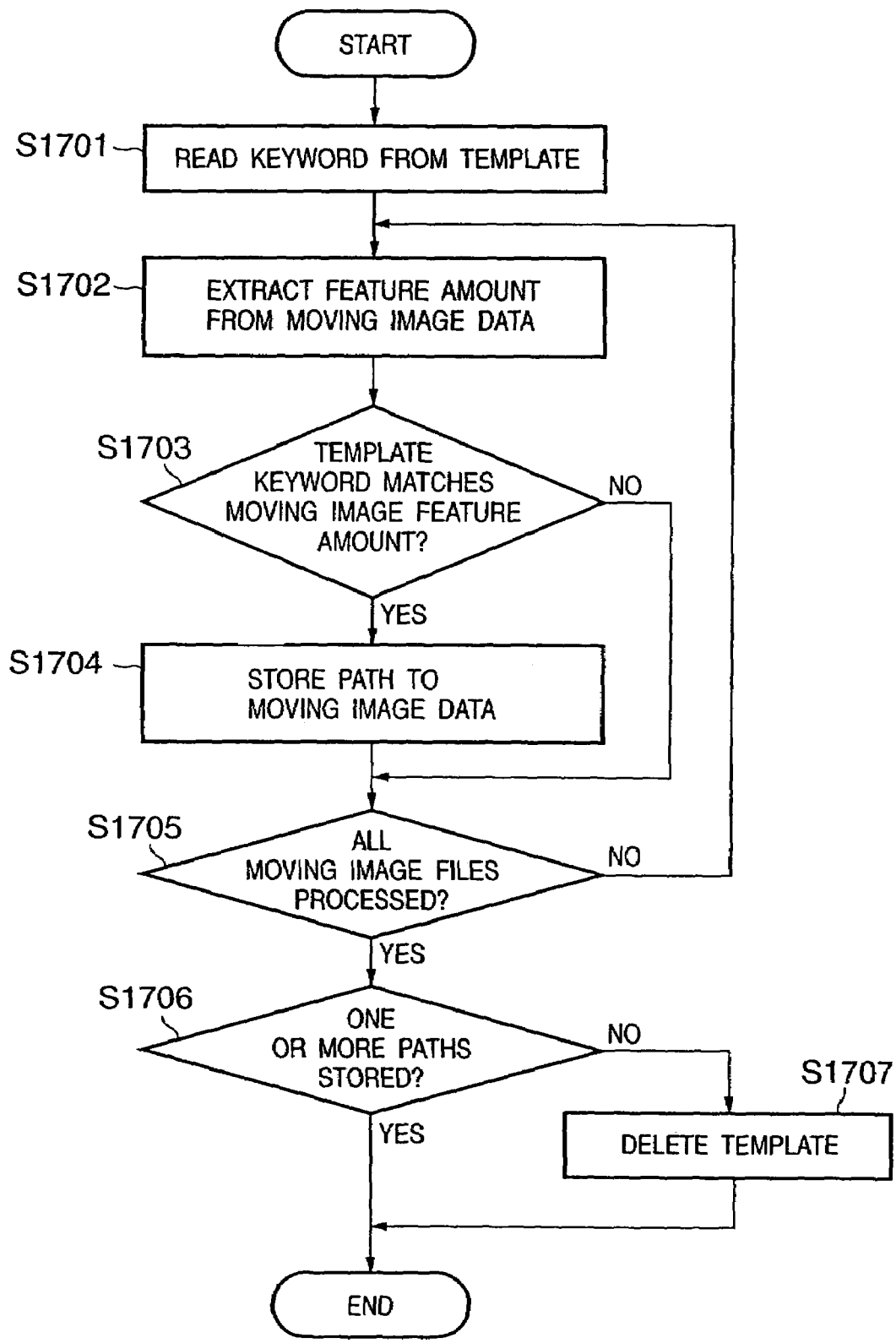
FIG. 16 is a flowchart showing the moving image data search processing by utilizing similar image search according to a third embodiment of the present invention.

FIG. 16 is a flowchart showing the moving image data search processing by utilizing the similar image search. Note that in FIG. 16, steps S1701, S1705 to S1707 are identical to steps S1501, S1505 to S1507 in FIG. 14.

At step S1701, all the keywords are read from a template and stored into the RAM 1106 in FIG. 10. At step S1702, one of the plural moving image data is read from the storage device 1102 in FIG. 10, and images are extracted at predetermined frame intervals from the moving image data. Then, feature amounts of all the extracted images are calculated and stored into the RAM 1106 in FIG. 10. Note that if the moving image data is stored as a moving image file as shown in FIG. 12A or 12B, the moving image data is extracted from the moving image file, and frame extraction and feature amount calculation are performed.

Next, at step S1703, the keyword of the template is compared with the feature amounts of the moving image data, to find a match. Note that the keyword is converted into an image feature amount by referring to a table of image feature amounts corresponding to respective keywords previously stored in the storage device 1102. For example, the system converts a template keyword "sunset" by referring to the table into a feature amount of "an image having an orange to yellow object at the center in a reddish background". Then the obtained feature amount is compared with each of the feature amounts stored into the RAM 1106 at step S1702.

If the feature amounts match or comparatively close to each other (fuzzy search), the process proceeds to step S1704. If the feature amounts do not match or not comparatively close to each other, the process proceeds to step S1705. At step S1704, the path of the moving image data in the storage device 1102 is stored into the RAM 1106. At step S1705, it is determined whether or not the processing at steps S1702 to S1704 has been performed on all the moving image data in the storage device 1102. If there is unprocessed image data, the process returns to step S1702, at which the above processing is performed on the remaining moving image data.

If the above processing has been performed on all the moving image data, the process proceeds to step S1706. At step S1706, it is determined whether or not a path to the moving image data exists in the RAM 1106. If no path exists, the process proceeds to step S1707. If a path exists, the search operation is terminated. At step S1707, the template having no moving image data matching the feature amount is deleted from the theme description, and the search operation is terminated.

As described above, according to the above second and third embodiments, moving image editing can be automatically performed by utilizing templates and moving image search. The user only selects a theme, and moving image editing is automatically performed. Thus troublesome works can be omitted.

Note that in the third embodiment, the scenic word "sunset" is used as the template keyword, however, other types of words e.g. a word directly expressing the color of image such as "red" or "orange" may be used. Further, it may be arranged such that a template has an image of "sunset" and a search is made for moving image data similar to the image.

Further, in the above embodiment, the feature amount of image is determined by the color and location in the image, however, it may be arranged such that the an outline is extracted from the image and the feature amount is determined based on the outline.

Further, in addition to the moving image data search described in the present embodiment, following moving image data search may be performed. For example, items "amount of movement (change) of moving image" or "level of sound" is provided in templates, and the value is set in the respective templates. The amount of movement or the level of sound of the moving image data in the moving image file is actually examined, and a search is made for data having a value close to the set value. Otherwise, it may be arranged such that audio data added to moving image data is recognized, and the audio data is compared with a template keyword.

Note that the classification into templates by similar image search in the third embodiment is applicable to the still image in FIG. 1.

As described above, according to the present invention, moving image editing can be automated, and moving image data can be easily edited.

Note that the object of the present invention can be also achieved by providing a storage medium (or recording medium) storing software program code for performing the aforesaid processes to a system or an apparatus, reading the program code with a computer (e.g., CPU, MPU) of the system or apparatus from the storage medium, then executing the program.

In this case, the program code read from the storage medium realizes the functions according to the embodiments, and the storage medium storing the program code constitutes the invention.

Further, the storage medium, such as a floppy disk, a hard disk, an optical disk, a magneto-optical disk, a CD-ROM, a CD-R, a DVD, a magnetic tape, a non-volatile type memory card, and ROM can be used for providing the program code.

Furthermore, besides aforesaid functions according to the above embodiments are realized by executing the program code which is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A data editing method for performing editing on binary data by using plural templates having keywords, comprising:
    an assignment step of assigning each of plural binary data to one of said plural templates based on said keywords; and
    a construction step of, upon reproduction of said plural binary data by using said plural templates, constructing reproduction data so as to reproduce said plural binary data in accordance with the result of assignment at said assignment step,
    wherein each of said plural templates has a limitation number for assignment of binary data,
    and wherein at said assignment step, if binary data more than the limitation number of one template are assigned to said template, remaining binary data are assigned to a predetermined template, and if binary data more than the limitation number of the predetermined template are assigned to the predetermined template, the predetermined template is newly generated, and the remaining binary data are assigned to the generated predetermined template.

2. The data editing method according to claim 1, wherein at said assignment step, each of said plural binary data is assigned to one of said plural templates, based on comparison between the keywords of said plural templates and keywords of said plural binary data.

3. The data editing method according to claim 2, wherein the keyword of said binary data is described in meta data added to each binary data.

4. The data editing method according to claim 1, wherein said binary data is image data, and wherein at said assignment step, each of said plural binary data is assigned to one of said plural templates, based on comparison between image feature amounts of the keywords of said plural templates and image feature amounts of keywords of said plural binary data.

5. The data editing method according to claim 1, further comprising a designation step of designating one of plural themes to which different combinations of plural different templates are linked, wherein at said assignment step, processing is performed by using plural templates linked to the theme designated at said designation step.

6. The data editing method according to claim 1, further comprising a designation step of designating a desired binary data group, wherein at said assignment step, processing is performed on respective binary data of the binary data group designated at said designation step.

7. The data editing method according to claim 1, wherein each of said plural templates has plural keywords with priorities, and wherein at said assignment step, binary data corresponding to a high priority keyword is assigned to each template.

8. The data editing method according to claim 1, further comprising a deletion step of deleting a template to which binary data has not been assigned at said assignment step from said plural templates.

9. The data editing method according to claim 1, further comprising:
    a designation step of designating a template upon reproduction of the reproduction data constructed at said construction step; and
    a reproduction step of reproducing the binary data assigned to the templates at said assignment step by reproducing data on the template designated at said designation step from said reproduction data.

10. The data editing method according to claim 1, wherein said binary data is moving image data, and wherein at said construction step, the reproduction data is constructed by describing a display description for reproducing moving images assigned to the templates at said assignment step in the templates.

11. The data editing method according to claim 10, wherein at said construction step, if plural moving image data are display-described in one template, predetermined processing is performed on a joint between the respective moving image data.

12. The data editing method according to claim 10, wherein at said construction step, if plural moving image data are display-described, display descriptions are made so as to reproduce the respective moving image data in time-sequential order by date of generation.

13. The data editing method according to claim 10, wherein plural themes and plural templates are stored in storage means, wherein plural templates to be used are registered in each of said plural themes, and wherein said method further comprises a selection step of selecting a desired one of said plural themes, further wherein processings at said assignment step and said construction step are performed on plural templates registered in the theme selected at said selection step.

14. The data editing method according to claim 13, wherein at said construction step, display descriptions are made for the plural templates registered in the theme selected at said selection step, and arranges the result of these descriptions as one file.

15. The data editing method according to claim 13, wherein said theme further registers a description for displaying a title.

16. The data editing method according to claim 10, further comprising a determination step of, if the moving image data is assigned to plural templates, determining only one template in which said moving image data is display-described.

17. The data editing method according to claim 16, wherein at said determination step, a template, having another moving image data with a date of generation closest to that of the moving image data display-described in the plural templates, is determined as said only one template.

18. The data editing method according to claim 10, wherein said template is described in a data description language.

19. The data editing method according to claim 10, wherein said moving image data has meta data linked to said moving image data, and wherein at said assignment step, assignment of moving image data is performed by searching for the meta data using said keyword.

20. The data editing method according to claim 19, wherein said meta data is described in a data description language.

21. The data editing method according to claim 10, wherein the moving image data are divided into a plurality of partial data and said meta data is added to each partial data, and wherein at said assignment step, assignment to template is performed by said partial data.

22. The data editing method according to claim 10, wherein said assignment step has:
a conversion step of converting a keyword into an image feature amount;
an acquisition step of acquiring an image feature amount from moving image data; and
a search step of searching for a moving image corresponding to said keyword based on the image feature amount obtained at said conversion step and the image feature amount acquired at said acquisition step, and wherein the moving image found at said search step is assigned to the template.

23. The data editing method according to claim 22, wherein said acquisition means acquires said image feature amount based on locations of colors in an image extracted from the moving image data.

24. The data editing method according to claim 22, wherein said acquisition means acquires said image feature amount based on an outline of an object existing in an image extracted from the moving image data.

25. The data editing method according to claim 10, wherein at said construction step, a title display is described in correspondence with said template.

26. A data editing apparatus for performing editing on binary data, comprising:
storage means for storing plural templates having keywords;
assignment means for assigning each of plural binary data to one of said plural templates based on said keywords; and
construction means for, upon reproduction of said plural binary data by using said plural templates, constructing reproduction data so as to reproduce said plural binary data in accordance with the result of assignment by said assignment means,
wherein each of said plural templates has a limitation number for assignment of binary data,
and wherein if binary data more than the limitation number of one template are assigned to said template, remaining binary data are assigned to a predetermined template, and if binary data more than the limitation number of the predetermined template are assigned to the predetermined template, the predetermined template is newly generated, and the remaining binary data are assigned to the generated predetermined template.

27. The data editing apparatus according to claim 26, wherein said assignment means assigns each of said plural binary data to one of said plural templates, based on comparison between the keywords of said plural templates and keywords of said plural binary data.

28. The data editing apparatus according to claim 27, wherein the keyword of said binary data is described in meta data added to each binary data.

29. The data editing apparatus according to claim 26, wherein said binary data is image data, and wherein said assignment means assigns each of said plural binary data to one of said plural templates, based on comparison between image feature amounts of the keywords of said plural templates and image feature amounts of keywords of said plural binary data.

30. The data editing apparatus according to claim 26, further comprising designation means for designating one of plural themes to which different combinations of plural different templates are linked, wherein said assignment means performs processing by using plural templates linked to the theme designated by said designation means.

31. The data editing apparatus according to claim 26, further comprising designation means designating a desired binary data group, wherein said assignment means performs processing on respective binary data of the binary data group designated by said designation means.

32. The data editing apparatus according to claim 26, wherein each of said plural templates has plural keywords with priorities, and wherein said assignment means assigns binary data corresponding to a high priority keyword to each template.

33. The data editing apparatus according to claim 26, further comprising deletion means for deleting a template to which binary data has not been assigned by said assignment means from said plural templates.

34. The data editing apparatus according to claim 26, further comprising:
designation means for designating a template upon reproduction of the reproduction data constructed by said construction means; and
reproduction means for reproducing the binary data assigned to the templates by said assignment means by reproducing data on the template designated by said designation means from said reproduction data.

35. The data editing apparatus according to claim 26, wherein said binary data is moving image data, and wherein said construction means constructs the reproduction data by describing a display description for reproducing moving images assigned to the templates by said assignment means in the templates.

36. The data editing apparatus according to claim 35, wherein if plural moving image data are display-described in one template, said construction means performs predetermined processing on a joint between the respective moving image data.

37. The data editing apparatus according to claim 35, wherein if plural moving image data are display-described, said construction means makes display descriptions so as to reproduce the respective moving image data in time-sequential order by date of generation.

38. The data editing apparatus according to claim 35, wherein plural themes and plural templates are stored in storage means, wherein plural templates to be used are registered in each of said plural themes, and wherein said apparatus further comprises selection means for selecting a desired one of said plural themes, further wherein said assignment means and said construction means perform processing on plural templates registered in the theme selected by said selection means.

39. The data editing apparatus according to claim 38, wherein said construction means makes display descriptions for the plural templates registered in the theme selected by said selection means, and arranges the result of these descriptions as one file.

40. The data editing apparatus according to claim 38, wherein said theme further registers a description for displaying a title.

41. The data editing apparatus according to claim 35, further comprising determination means for, if the moving image data is assigned to plural templates, determining only one template in which said moving image data is display-described.

42. The data editing apparatus according to claim 41, wherein said determination means determines a template, having another moving image data with a date of generation closest to that of the moving image data display-described in the plural templates, as said only one template.

43. The data editing apparatus according to claim 35, wherein said template is described in a data description language.

44. The data editing apparatus according to claim 35, wherein said moving image data has meta data linked to said moving image data, and wherein said assignment means performs assignment of moving image data by searching for the meta data using said keyword.

45. The data editing apparatus according to claim 44, wherein said meta data is described in a data description language.

46. The data editing apparatus according to claim 35, wherein the moving image data are divided into a plurality of partial data and said meta data is added to each partial data, and wherein said assignment means performs assignment to template by said partial data.

47. The data editing apparatus according to claim 35, wherein said assignment means has:
conversion means for converting a keyword into an image feature amount;
acquisition means for acquiring an image feature amount from moving image data; and
search means for searching for a moving image corresponding to said keyword based on the image feature amount obtained by said conversion means and the image feature amount acquired by said acquisition means, and wherein the moving image found by said search means is assigned to the template.

48. The data editing apparatus according to claim 47, wherein said acquisition means acquires said image feature amount based on locations of colors in an image extracted from the moving image data.

49. The data editing apparatus according to claim 47, wherein said acquisition means acquires said image feature amount based on an outline of an object existing in an image extracted from the moving image data.

50. The data editing apparatus according to claim 35, wherein said construction means describes a title display in correspondence with said template.

51. A control program stored on a computer readable medium for executing data editing processing by a computer for performing editing on binary data by using plural templates having keywords, said control program comprising:
assignment process code for assigning each of plural binary data to one of said plural templates based on said keywords; and
construction process code for, upon reproduction of said plural binary data by using said plural templates, constructing reproduction data so as to reproduce said plural binary data in accordance with the result of assignment at said assignment process,
wherein each of said plural templates has a limitation number for assignment of binary data,
and wherein if binary data more than the limitation number of one template are assigned to said template, remaining binary data are assigned to a predetermined template, and if binary data more than the limitation number of the predetermined template are assigned to the predetermined template, the predetermined template is newly generated, and the remaining binary data are assigned to the generated predetermined template.

52. An image processing method comprising:
a designation step of designating image data and a template; and
an output control step of outputting the image data designated in the designation step together with the template designated in the designation step,
wherein the template has a limitation number for assignment of image data, and if it is determined that image data more than the limitation number of the template in the designation step are assigned to said template, remaining image data are assigned to a predetermined template, and if image data more than the limitation number of the predetermined template are assigned to the predetermined template, the predetermined template is newly generated, and the remaining image data are assigned to the generated predetermined template.

53. An image processing apparatus comprising:
designation means for designating image data and a template; and
output control means for outputting the image data designated by the designation means together with the template designated by the designation means,
wherein the template has a limitation number for assignment of image data, and if it is determined that image data more than the limitation number of the template by the designation means are assigned to said template, remaining image data are assigned to a predetermined template, and if image data more than the limitation number of the predetermined template are assigned to the predetermined template, the predetermined template is newly generated, and the remaining image data are assigned to the generated predetermined template.

54. A control program stored on a computer readable medium for executing image processing by a computer, said control program comprising:
designation process code for designating image data and a template; and output control process code for outputting the image data designated by the designation process code together with the template designated by the designation process code, wherein the template has a limitation number for assignment of image data, and if it is determined that image data more than the limitation number of the template by the designation process code are assigned to said template, remaining image data are assigned to a predetermined template, and if image data more than the limitation number of the predetermined template are assigned to the predetermined template, the predetermined template is newly generated, and the remaining image data are assigned to the generated predetermined template.

* * * * *

UNITED STATES PATENT AND TRADEMARK OFFICE
CERTIFICATE OF CORRECTION

PATENT NO. : 7,054,508 B2  Page 1 of 1
APPLICATION NO. : 09/916265
DATED : May 30, 2006
INVENTOR(S) : Takashi Hanamoto It is certified that error appears in the above-identified patent and that said Letters Patent is hereby corrected as shown below:

TITLE PAGE:
(*) Notice: "550 days" should read -- 580 days --.

DRAWINGS:
Sheet 15, Figure 6, "POLL" should read -- POLE --.

COLUMN 6:
Line 39, "one" should read -- one of the --.

COLUMN 11:
Line 15, "another" should read -- other --; and
Line 44, "template." should read -- templates. --.

COLUMN 12:
Line 24, "matches" should read -- match --;
Line 47, "step 1504," should read -- step S1504, --;
Line 60, "is" should read -- is a --; and
Line 67, "processing" should read -- processes --.

COLUMN 13:
Line 5, "processing," should read -- process, --.

COLUMN 14:
Line 53, "the an" should read -- an --.

COLUMN 21:
Line 8, "tem" should read -- tem- --.

Signed and Sealed this

Twenty-fourth Day of July, 2007

JON W. DUDAS
*Director of the United States Patent and Trademark Office*